(12) United States Patent
Bianchi

(10) Patent No.: US 12,376,706 B2
(45) Date of Patent: Aug. 5, 2025

(54) ROTARY GRATER

(71) Applicant: Stephan Bianchi, Santa Cruz, CA (US)

(72) Inventor: Stephan Bianchi, Santa Cruz, CA (US)

(73) Assignee: Revise Products LLC, Santa Cruz, CA (US)

( * ) Notice: Subject to any disclaimer, the term of this patent is extended or adjusted under 35 U.S.C. 154(b) by 288 days.

(21) Appl. No.: 18/117,421

(22) Filed: Mar. 4, 2023

(65) Prior Publication Data

US 2023/0277008 A1 Sep. 7, 2023

Related U.S. Application Data

(60) Provisional application No. 63/407,724, filed on Sep. 18, 2022, provisional application No. 63/316,418, filed on Mar. 4, 2022.

(51) Int. Cl.
*A47J 43/25* (2006.01)
(52) U.S. Cl.
CPC .................... *A47J 43/255* (2013.01)
(58) Field of Classification Search
CPC ................ A47J 43/255; A47J 43/25
See application file for complete search history.

(56) References Cited

U.S. PATENT DOCUMENTS

| 507,287 | A | 10/1893 | Scarles |
|---|---|---|---|
| 855,423 | A | 5/1907 | Alger |
| 2,271,175 | A | 1/1942 | Mantelet |
| 2,502,867 | A | 4/1950 | Mantelet |
| 2,587,186 | A | 2/1952 | Mantelet |
| 2,604,916 | A | 7/1952 | Mantelet |
| D235,501 | S | 6/1975 | Mantelet |
| 4,201,349 | A | 5/1980 | Walsh |
| D276,202 | S | 11/1984 | Shun |

(Continued)

FOREIGN PATENT DOCUMENTS

| DE | 411743 C | * | 4/1925 |
|---|---|---|---|
| EP | 3610801 A2 | | 2/2020 |

(Continued)

OTHER PUBLICATIONS

English translate (DE411743C), retrieved date Mar. 30, 2025.*

(Continued)

*Primary Examiner* — Mohammed S. Alawadi
(74) *Attorney, Agent, or Firm* — The Law Office of Patrick F. O'Reilly III, LLC

(57) ABSTRACT

A rotary grater includes a grater body with a body arm portion; a rotatable cutting device; a grater plunger with plunger arm portion connected to a plunger head portion; and a lever member pivotably coupled to the plunger arm portion or the body arm portion, the lever member having a first lever end portion and a second lever end portion, the second lever end portion of the lever member being oppositely disposed relative to the first lever end portion, the first lever end portion of the lever member configured to receive an input force applied by a user, and the second lever end portion of the lever member configured to apply an output force against a bearing wall of the grater body or the grater plunger so as to facilitate a compressing of the workpiece between the plunger head portion and the rotatable cutting device while grating the workpiece.

21 Claims, 21 Drawing Sheets

(56) References Cited

U.S. PATENT DOCUMENTS

| | | | |
|---|---|---|---|
| 4,891,883 | A | 1/1990 | Mantele |
| 5,660,341 | A | 8/1997 | Perkins et al. |
| 5,803,378 | A | 9/1998 | Wolters |
| 6,409,107 | B1 | 6/2002 | Romano |
| D493,074 | S | 7/2004 | Brousseau et al. |
| 6,766,972 | B1 | 7/2004 | Prommel et al. |
| D517,871 | S | 3/2006 | Takayama et al. |
| D517,873 | S | 3/2006 | So |
| 7,137,581 | B2 | 11/2006 | Takayama et al. |
| D537,305 | S | 2/2007 | Wan |
| 7,337,997 | B2 | 3/2008 | Ko |
| D578,839 | S | 10/2008 | McGuyer et al. |
| 7,793,875 | B2 | 9/2010 | Hurst |
| D679,962 | S | 4/2013 | Ruegg et al. |
| 8,789,781 | B2 | 7/2014 | Sampaio |
| D787,897 | S | 5/2017 | Rose |
| 11,278,285 | B2 | 3/2022 | Deck et al. |
| D1,059,136 | S | 1/2025 | Bianchi |
| 2004/0079820 | A1 | 4/2004 | So |
| 2005/0082401 | A1 | 4/2005 | Takayama et al. |
| 2007/0175342 | A1* | 8/2007 | Knusel .................. A47J 19/06 100/234 |
| 2008/0271614 | A1 | 11/2008 | Chan |
| 2010/0270406 | A1* | 10/2010 | Grace .................. A47J 43/255 241/273.3 |
| 2011/0284670 | A1 | 11/2011 | Jenkins et al. |
| 2013/0206883 | A1* | 8/2013 | Ebrahim .............. A47J 43/255 241/169.1 |
| 2023/0277008 | A1 | 9/2023 | Bianchi |

FOREIGN PATENT DOCUMENTS

| | | |
|---|---|---|
| EP | 3599836 B1 | 5/2021 |
| WO | 1999010100 A1 | 3/1999 |

OTHER PUBLICATIONS

"Microplane 2 In 1 Rotary Grater-Black Classic," NocNoc Website, Web page <https://nocnoc.com/p/Kitchen-Knives/Microplane-2-in-1-Rotary-grater-Black-%E0%B8%97%E0%B8%B5%E0%B9%88%E0%B8%82%E0%B8%B9%E0%B8%94%E0%B8%9C%E0%B8%B4%E0%B8%A7%E0%B8%8B%E0%B8%B5%E0%B8%AA-classic/10948064>, 1 page, dated at least as early as Feb. 2010, retrieved from www.nocnoc.com website on Jul. 4, 2024.

"Chef'n Spring Loaded Rotary Cheese Grater, Easy to Clean, White", Amazon Website, Web page <https://www.amazon.com/Chefn-Spring-Loaded-Rotary-Cheese/dp/B07M65SDPR>, 10 pages, dated at least as early as Apr. 2019, retrieved from www.amazon.com website on Jul. 4, 2024.

"Rotary Grater, Indigo", Amazon Website, Web page <https://www.amazon.com/Savora-5099600-Rotary-Grater-Indigo/dp/B00BEKYL00?th=1>, 8 pages, dated Feb. 11, 2013, retrieved from www.amazon.com website on Jul. 4, 2024.

"Pampered Chef Cheese Rotary Grater", Amazon Website, Web page <https://www.amazon.com/Pampered-Chef-Cheese-Rotary-Grater/dp/B001UP20KW>, 7 pages, dated Mar. 5, 2009, retrieved from www.amazon.com website on Jul. 4, 2024.

"LHS Rotary Cheese Graters for Kitchen, Professional Manual Crank Handheld Cheese Grater with Stainless Steel Drum for Grating Hard Cheese, Chocolate, Nuts and More", Amazon Website, Web page <https://www.amazon.com/LHS-Graters-Handheld-Stainless-Chocolate/dp/B07X7W8GLW?th=1>, 8 pages, dated at least as early as Dec. 2019, retrieved from www.amazon.com website on Apr. 13, 2024.

PCT Form 210, International Search Report for PCT/US2023/014553, 2 pages, mailed on May 25, 2023.

PCT Form 237, Written Opinion of the International Searching Authority for PCT/US2023/014553, 5 pages, mailed on May 25, 2023.

"Zyliss Classic Rotary Cheese Grater", Kitchen & Company Website, Web page <https://kitchenandcompany.com/products/zyliss-classic-rotary-cheese-grater>, 2 pages, dated at least as early as Apr. 2022, retrieved from www.kitchenandcompany.com website on Jul. 4, 2024.

"Zyliss Professional Cheese Grater, NSF Certified", Zyliss Website, Web page <https://zyliss.com/products/zyliss-professional-cheese-grater-e900020u>, 5 pages, dated at least as early as Apr. 2020, retrieved from www.zyliss.com website on Jul. 4, 2024.

"Rotary Cheese Grater", Lee Valley Website, Web page <https://www.leevalley.com/en-US/shop/kitchen/kitchen-tools/graters-and-zesters/111808-rotary-cheese-grater?item=EV534>, 5 pages, dated at least as early as Apr. 2022, retrieved from www.leevalley.com website on Jul. 4, 2024.

"Chef'n Chef's GraterZoom Grater and Slicer, One Size, Arugula/Wasabi", Amazon Website, Web page <https://www.amazon.com/Chefn-102-740-337-GraterZoom-Grater-Arugula/dp/B07DNSX1W9>, 7 pages, dated Jun. 12, 2018, retrieved from www.amazon.com website on Jul. 4, 2024.

"Zulay Kitchen Cheese Grater Hand Crank, Grater For Kitchen With Reinforced Suction—Rotary Cheese Grater With 3 Replaceable Stainless Steel Blades—Easy to Use & Clean—Vegetable Cutter—Blue", Amazon Website, Web page <https://www.amazon.com/Zulay-Rotary-Cheese-Grater-Blades/dp/B08RD2FPP6?th=1>, 10 pages, dated Oct. 11, 2021, retrieved from www.amazon.com website on Jul. 4, 2024.

"Fante's Rotary Cheese Grater, The Italian Market Original Since 1906, Green", Amazon Website, Web page <https://www.amazon.in/Fantes-Cousin-Bartolomeos-Rotary-Cheese/dp/B010S2NC72>, 4 pages, dated Sep. 1, 2017, retrieved from www.amazon.com website on Jul. 4, 2024.

"Grate Master Shredder", Tupperware Website, Web page <https://www.tupperware.com/products/grate-master-shredder-accessory>, 1 page, dated at least as early as Apr. 2022, retrieved from www.tupperware.com website on Jul. 4, 2024.

"Nut and Cheese Grater by Rigamonti", Amazon Website, Web page <https://www.amazon.com/SCI-Scandicrafts-Rigamonti_40-Cheese-Rigamonti/dp/B0006GZ4Y0>, 7 pages, dated Nov. 29, 2006, retrieved from www.amazon.com website on Jul. 4, 2024.

Amazon.com. TONMA Multi-Purpose Rotary Cheese Grater with 1 SS Handheld Drums for Parmesan, Mozzarella, Vegetables and More, Ergonomic Design. ASIN: CG0120191230, date first available Dec. 30, 2019 (Year: 2019).

Examination Report from the UK Intellectual Property Office for Appl. No. GB2414110.3, dated Feb. 27, 2025.

* cited by examiner

ROTARY GRATER

CROSS-REFERENCE TO RELATED APPLICATIONS

This patent application claims priority to U.S. Provisional Patent Application No. 63/316,418, entitled "Device, system and method for grating cheese, chocolate, nuts and the like", filed on Mar. 4, 2022, and U.S. Provisional Patent Application No. 63/407,724, entitled "Three-Lever Hand-Held Rotary Drum Grater", filed on Sep. 18, 2022, the disclosure of each of which is hereby incorporated by reference as if set forth in its entirety herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF DISCLOSURE

1. Field of the Disclosure

The disclosure generally relates to a rotary grater. More particularly, the disclosure relates to a hand-held rotary grater for grating a variety of different workpieces, such as food items.

2. Background

Conventional rotational hand graters for grating food items are known. In use, a chunk of cheese or other food item is inserted into a receptacle of the grater. The grater is gripped in one hand by the handle of the grater. As the handle portions of the grater are pressed towards each other, the plunger advances the workpiece towards the drum. Rotation of the drum by the crank held in the other hand of the user drives the cutting edges into the workpiece to shred it. The shreds enter the curved wall of the drum and exit through the side opposite the crank.

A major disadvantage of the conventional grater design is that the hand grip of the user, applied between the fulcrum of the hinge and the workpiece levered into the drum, has negative mechanical advantage. To reduce this negativity, the handle portions can be lengthened. This, however, creates further problems because longer handle portions take up more storage space. Further, longer handle portions reduce torsional stiffness, enabling the plunger, when pressing on an uncentered workpiece, to twist into the path of the rotating blades, abrading the plunger and adding the resulting plastic chips to prepared meals.

As such, there is a need for a hand-held rotary grater that performs one or more of the following benefits: (1) the grater requires minimal hand strength to keep the workpiece engaged, (2) the grater does not grate itself, thereby preventing the addition of plastic to food, (3) the grater takes up minimal space in a drawer, and (4) the grater can be manufactured inexpensively.

SUMMARY OF THE DISCLOSURE

Accordingly, the present disclosure is directed to a rotary grater that substantially obviates one or more problems resulting from the limitations and deficiencies of the related art.

In accordance with one or more embodiments of the present disclosure, there is provided a rotary grater that comprises a grater body, the grater body including a cutter housing portion, a hopper portion connected to the cutter housing portion, and a body arm portion extending outwardly from the hopper portion, the hopper portion of the grater body being configured to hold a workpiece for grating; a rotatable cutting device, the rotatable cutting device configured to be rotatably disposed inside the cutter housing portion of the grater body, the rotatable cutting device comprising a plurality of blade members for grating the workpiece; a rotary input device coupled to the rotatable cutting device, the rotary input device configured to rotate the rotatable cutting device; a grater plunger, the grater plunger including a plunger arm portion connected to a plunger head portion, the plunger arm portion having a first arm end and a second arm end, the second arm end of the plunger arm portion being oppositely disposed relative to the first arm end, the first arm end of the plunger arm portion being pivotably coupled to a distal end of the body arm portion, and the second arm end of the plunger arm portion being connected to the plunger head portion, the plunger head portion configured to compress the workpiece in the hopper portion during the grating of the workpiece; and a lever member pivotably coupled to the plunger arm portion or the body arm portion, the lever member having a first lever end portion and a second lever end portion, the second lever end portion of the lever member being oppositely disposed relative to the first lever end portion, the first lever end portion of the lever member configured to receive an input force applied by a user, and the second lever end portion of the lever member configured to apply an output force against a bearing wall of the grater body or the grater plunger so as to facilitate a compressing of the workpiece between the plunger head portion and the rotatable cutting device during the grating of the workpiece.

In a further embodiment of the present disclosure, the lever member is pivotably coupled to a middle region of the plunger arm portion, and the bearing wall against which the output force of the second lever end portion of the lever member is applied comprises a part of the grater body.

In yet a further embodiment, the lever member is pivotably coupled to a middle region of the plunger arm portion by a first pin member, and the first arm end of the plunger arm portion is pivotably coupled to the distal end of the body arm portion by a second pin member.

In still a further embodiment, the first pin member is integrally formed with the lever member, and the second pin member is integrally formed with the plunger arm portion of the grater plunger.

In yet a further embodiment, the lever member is pivotably coupled to a middle region of the body arm portion, and the bearing wall against which the output force of the second lever end portion of the lever member is applied comprises a part of the grater plunger.

In still a further embodiment, the lever member is pivotably coupled to a middle region of the body arm portion by a first pin member, and the first arm end of the plunger arm portion is pivotably coupled to the distal end of the body arm portion by a second pin member.

In yet a further embodiment, the rotary input device comprises a crank coupled to the rotatable cutting device, the crank configured to rotate the rotatable cutting device when the crank is rotated by the user.

In still a further embodiment, the crank comprises a crank arm and a handle portion coupled to the crank arm, the handle portion configured to be grasped by the user when the crank is being rotated by the user; and the crank is removably coupled to the rotatable cutting device such that the crank is reversible from a first configuration where the handle portion projects outwardly from the rotary grater to a second configuration where the handle portion projects inwardly towards a centerline of the rotary grater, the second configuration enabling the rotary grater to be more compact for storage.

In yet a further embodiment, the crank comprises a wishbone-shaped body portion coupled to a handle portion, the wishbone-shaped body portion including a first branch with a first attachment member and a second branch with a second attachment member; the rotatable cutting device comprises a first tab member and a second tab member, the second tab member being oppositely disposed relative to the first tab member; and, when the first and second branches of the wishbone-shaped body portion are displaced inwardly toward one another by the user, the first attachment member is configured to be removably engaged with the first tab member, and the second attachment member is configured to be removably engaged with the second tab member so as to removably attach the crank to the rotatable cutting device.

In still a further embodiment, the cutter housing portion of the grater body comprises a first housing section hingedly connected to a second housing section for allowing the rotatable cutting device to be inserted into the cutter housing portion and removed from the cutter housing portion.

In yet a further embodiment, the cutter housing portion of the grater body further comprises a securement device for removably retaining the first housing section and the second housing section in a closed configuration.

In still a further embodiment, the rotatable cutting device comprises a cylindrical cutting device and the rotary input device comprises a crank connected to a first circular frame member, the first circular frame member configured to be removably attached to one end of the cylindrical cutting device.

In yet a further embodiment, the rotatable cutting device further comprises a second circular frame member configured to be removably attached to the other end of the cylindrical cutting device that is opposite to the end on which the first circular frame member is attached.

In still a further embodiment, the lever member is pivotably coupled to a middle region of the plunger arm portion, and the bearing wall against which the output force of the second lever end portion of the lever member is applied comprises a part of the grater body; and the lever member comprises a first lever section hingedly coupled to a second lever section, the first lever section including the first lever end portion of the lever member that is configured to receive the input force applied by the user, and the second lever section including the second lever end portion of the lever member that is configured to apply the output force against the bearing wall of the grater body.

In yet a further embodiment, the first and second lever sections of the lever member are pivotably coupled to one another and to a middle region of the plunger arm portion by a first pin member, and the first arm end of the plunger arm portion is pivotably coupled to the distal end of the body arm portion by a second pin member.

In still a further embodiment, the lever member further comprises an actuator spring disposed around the first pin member, the actuator spring coupling the first lever section to the second lever section so that, when the input force is applied to the first lever section, a torque generated by the input force applied to the first lever section is substantially transferred to the second lever section so as to apply the output force against the bearing wall of the grater body.

In yet a further embodiment, the rotary grater further comprises a locking member for maintaining the first lever section in a depressed position; and, while the first lever section is maintained in the depressed position, the actuator spring results in the plunger head portion maintaining a continuous compressive force on the workpiece in the hopper portion during the grating of the workpiece.

It is to be understood that the foregoing general description and the following detailed description are merely exemplary and explanatory in nature. As such, the foregoing general description and the following detailed description should not be construed to limit the scope of the appended claims in any sense.

BRIEF DESCRIPTION OF THE SEVERAL VIEWS OF THE DRAWINGS

The rotary grater will now be described, by way of example, with reference to the accompanying drawings, in which.

Throughout the figures, the same parts are always denoted using the same reference characters so that, as a general rule, they will only be described once.

DETAILED DESCRIPTION OF ILLUSTRATIVE EMBODIMENTS

In the illustrative embodiments described hereinafter, a hand-held rotary grater includes an additional lever to maximize force the operator can apply to the plunger feeding the workpiece into the grating drum (a type of rotatable cutting device). A crank (a type of rotary input device) may be removably affixed to one side of the drum in such a way that it can be reaffixed on the opposite side, or reversed to minimize the space required for storage of the grater. The method of attachment is designed so as to be sturdy, but simply molded.

The hand-held rotary grater described hereinafter may be used for grating cheese, chocolate, nuts, vegetables, and other comestibles (types of workpieces). The hand-held rotary grater also may be used for larger industrial products.

The structural configuration of the grater described herein makes it easier to press gratable material into the blades of the rotating drum.

A first illustrative embodiment of a hand-held rotary grater is seen generally at 100 in FIGS. 1-9. In the first illustrative embodiment, referring initially to FIG. 1, a cylindrical stainless-steel drum 10 is centered in a barrel 12 (a type of cutter housing portion) that is a part of a complete grater body 14. The drum 10 is perforated at regular intervals. Portions of the drum 10 adjacent to the perforations are embossed outwards and sharpened to create unidirectional blades 16.

Figure 1:
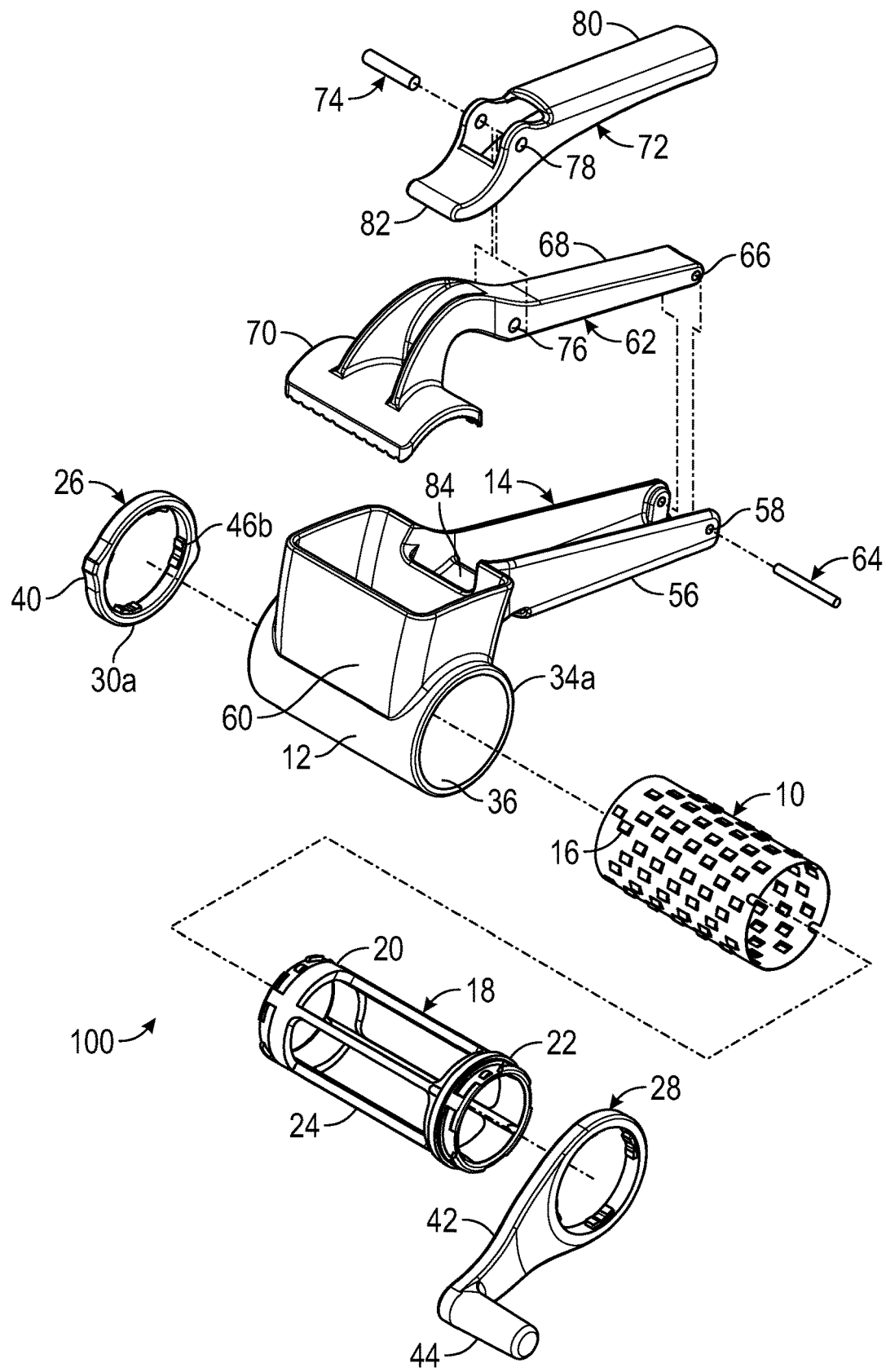
FIG. 1 is an exploded three-quarter perspective view of an upper front left side of a hand-held rotary grater, according to a first illustrative embodiment, wherein the handle of the grater crank is disposed on a left side of the grater in an operative position.
Figure 2:
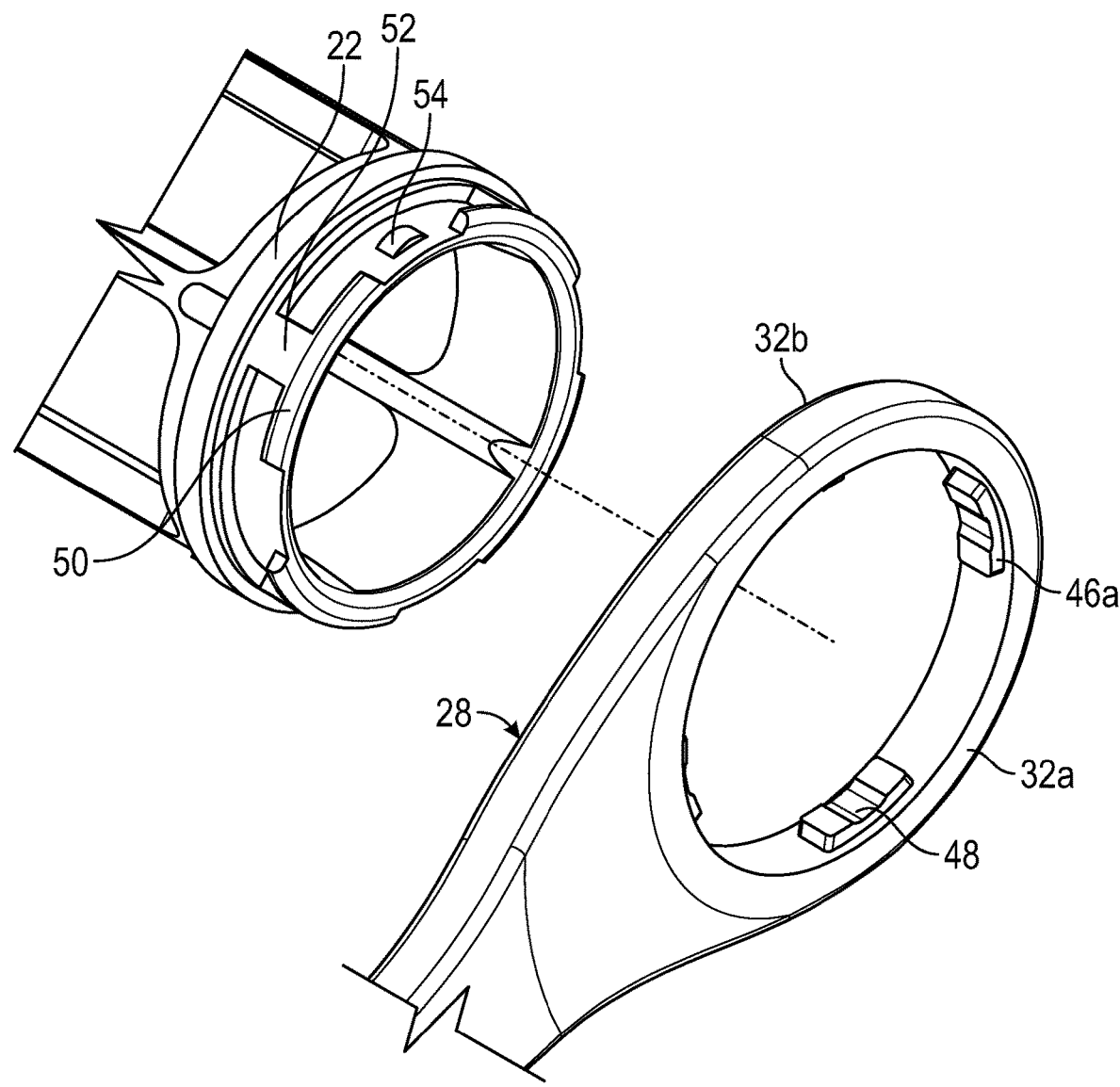
FIG. 2 is an enlarged perspective view of a portion of FIG. 1, wherein the end of the drum support and crank is depicted.
Figure 3:
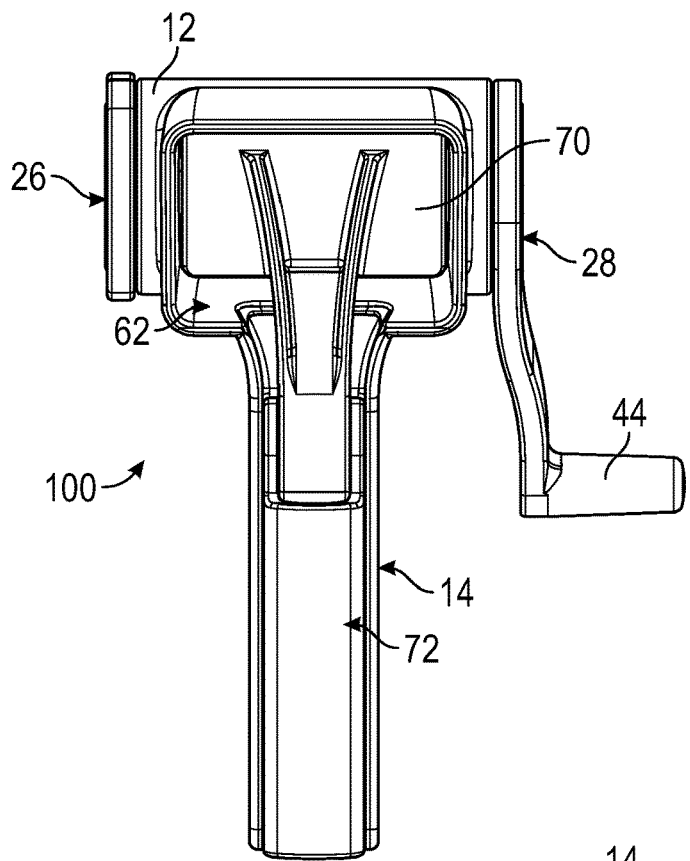
FIG. 3 is a top view of the hand-held rotary grater of FIG. 1, wherein the handle of the grater crank is disposed on a right side of the grater in an operative position.
Figure 6:
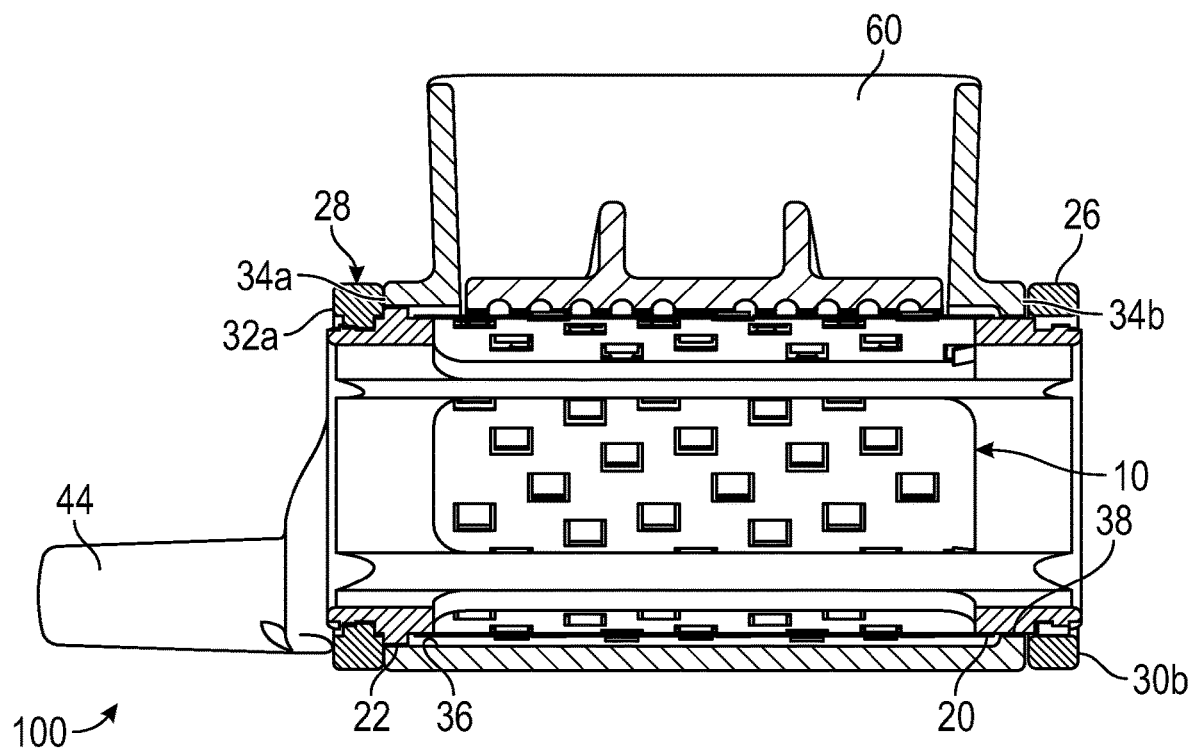
FIG. 6 is a transverse cross-sectional view of the hand-held rotary grater of FIG. 1, wherein the cross-sectional view is looking forward from the center of the drum, and the handle of the grater crank is disposed on a left side of the grater in an operative position.
Figure 7:
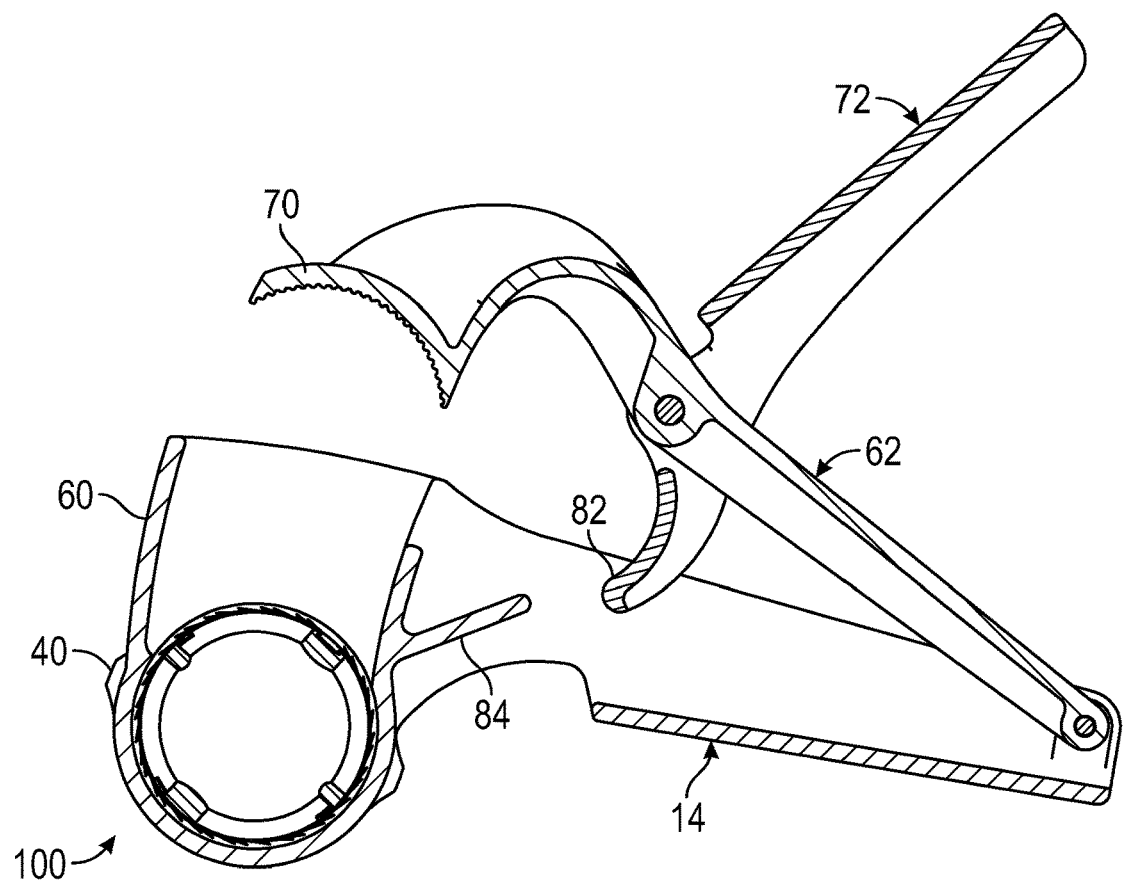
FIG. 7 is a longitudinal cross-sectional view of the hand-held rotary grater of FIG. 1, wherein the grater plunger has been raised so that a workpiece is able to be loaded into the hopper portion of the grater.
Figure 8:
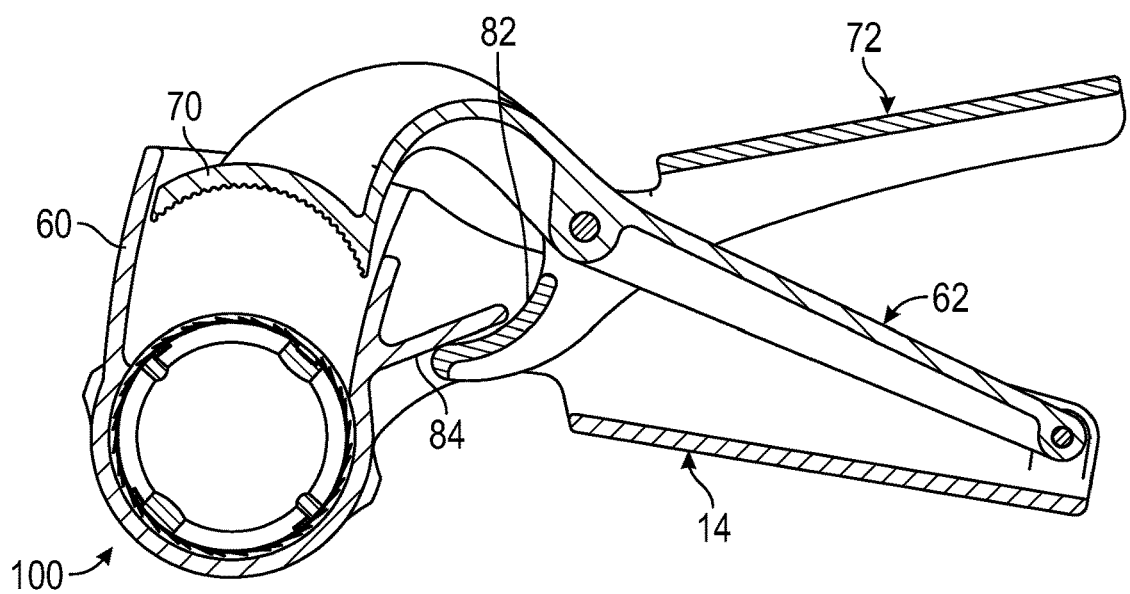
FIG. 8 is a longitudinal cross-sectional left-side view of the hand-held rotary grater of FIG. 1, wherein the grater is depicted at the start of the compression stroke.
Figure 9:
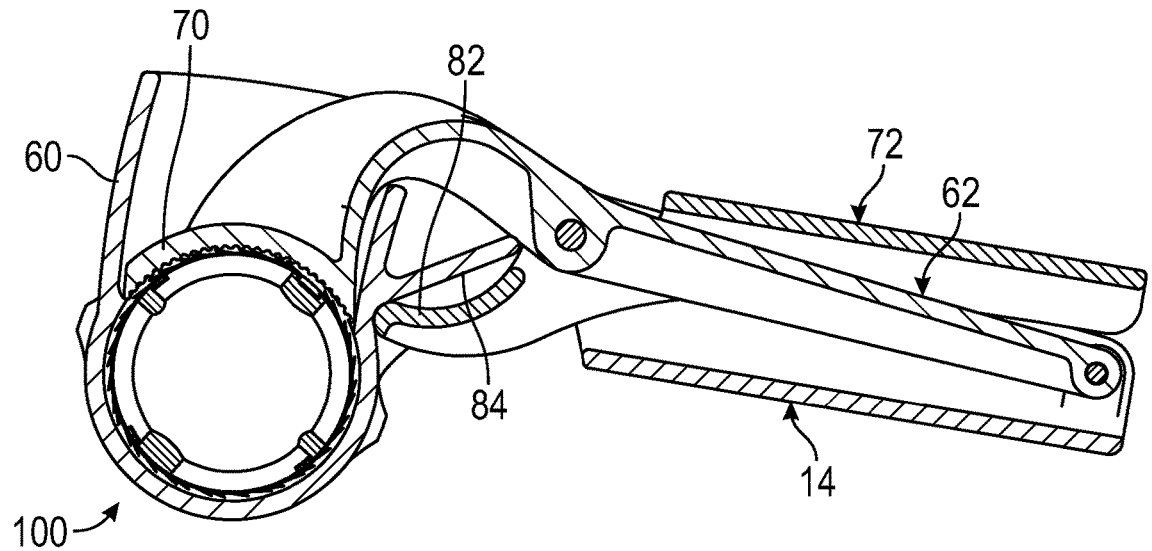
FIG. 9 is another longitudinal cross-sectional left-side view of the hand-held rotary grater of FIG. 1, wherein the grater is depicted at the end of the compression stroke.
Figure 10:
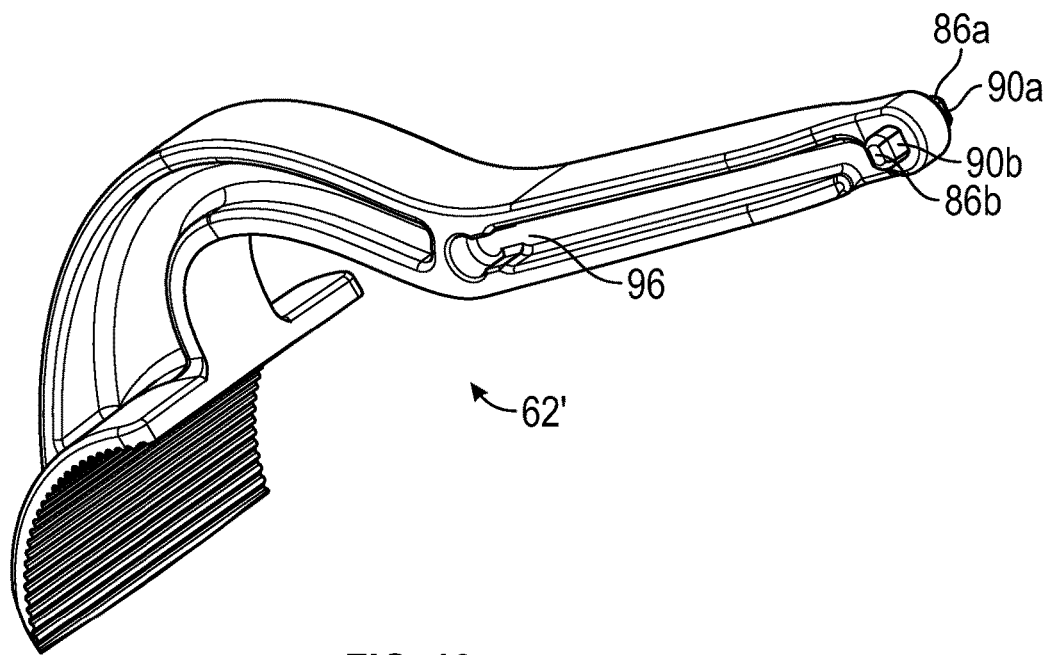
FIG. 10 is a left-rear perspective view of a grater plunger of a hand-held rotary grater, according to a second illustrative embodiment.
Figure 11:
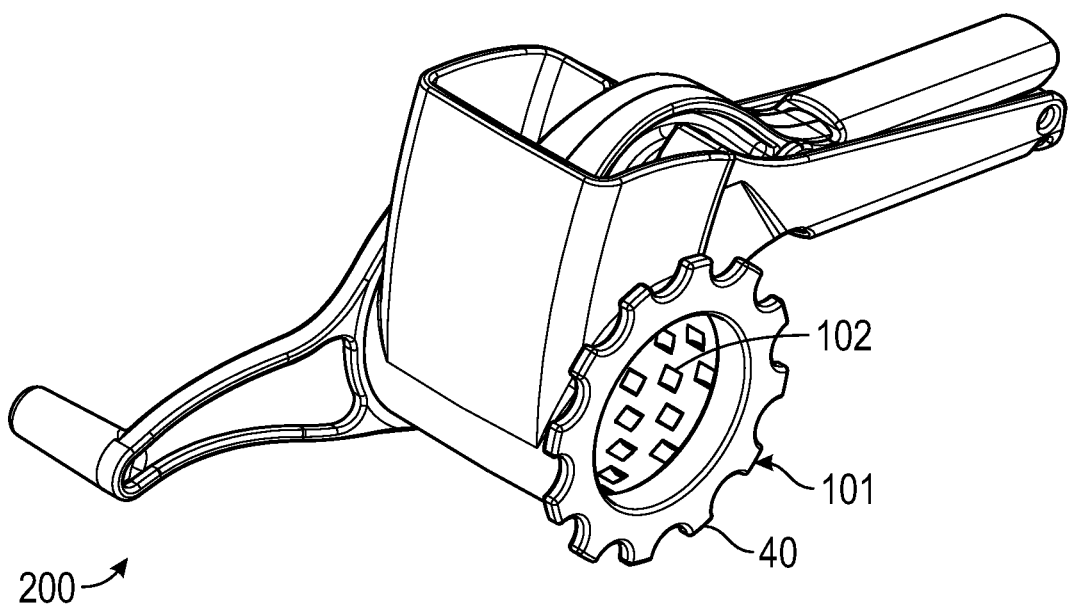
FIG. 11 is a three-quarter perspective view of an upper front left side of a hand-held rotary grater, according to the second illustrative embodiment, wherein the handle of the grater crank is disposed on a right side of the grater in an operative position.

Referring to FIGS. 1, 2, and 6, in the first illustrative embodiment, it can be seen that the drum 10 is fixed upon a drum frame 18 that provides a large diameter drum bearing 22 at one end and a small diameter drum bearing 20 on the other end. Drum support ribs 24 connect the two bearings 20, 22. A retainer 26 is removably affixed to one end of the drum 10. A crank 28 is removably affixed to the other end of the drum 10. Both have bearing surfaces on either side: retainer thrust bearing 30*a*, 30*b* and crank thrust bearing 32*a*, 32*b*. These bearing surfaces mate with barrel thrust bearings 34*a*, 34*b* on either side of the barrel 12 to constrain the drum 10 rotatably between them. The inner surface of the barrel 12 has a large diameter barrel bearing 36 that mates with the large diameter drum bearing 22. The inner surface of the barrel 12 also has a small diameter barrel bearing 38 at one end that mates with the small diameter drum bearing 20. The outer surface of the retainer 26 bears grip nubs 40. The outer surface of the crank 28 bears a crank arm 42 with a knob or handle 44 mounted normal to the far end. Both the retainer 26 and the crank 28 bear identical locking tabs 46*a*, 46*b* centered along the inner surface. Each locking tab 46*a*, 46*b* bears a locking notch 48 at the center.

In the first illustrative embodiment, the two ends of the drum support outboard of the bearing surfaces are essentially identical. T-shaped locking ridges are applied to the outer cylindrical wall of the drum frame. T-shaped locking rib arms 50 are aligned with the ends of the drum frame such that the tabs of either ring can be slid between the arms 50 of the Ts, and captured by rotating them against the T-shaped locking rib stems 52. Locking nubs 54, located on the outer walls of the drum frame between the stems 52 engage with the locking notches 48 to lock the rings into place.

Advantageously, the grater 100 of the first illustrative embodiment provides for more tabs to engage more ridges held in place by detent bumps. The ridges and detent bumps are arranged in such a way that the drum can be molded in a three-part mold without slides. In the grater 100 of the first illustrative embodiment, the divots and bumps, molded into the relatively flexible sides of the circular cylinders of the drum, crank and ring of the present design are therefore sprung, rather than merely compressed together. That is, the grater 100 has crank attachment detents sprung by rings. Also, in the grater 100, the annular ridges inside the barrel and outside the drum serve as robust rotational bearing surfaces.

In the first illustrative embodiment, the drum 10 is encased in the cylindrical barrel 12 which is open at both sides. The crank 28 is on one side of the barrel 12, with the other side open to release processed material.

With reference to FIGS. 1 and 7-9, in the first illustrative embodiment, the grater body 14 with barrel 12 also bears a barrel arm 56 that extends away from the barrel 12 to support a barrel plunger bore 58. The barrel 12 is surmounted by a hopper 60, which, along with the barrel arm 56, forms the complete grater body 14. The drum 10 serves as the bottom of the hopper 60. A plunger 62 is rotatably affixed to the barrel plunger pivot bore 58 by a first pivot pin 64 centered in a plunger barrel bore 66. A plunger arm 68 extends forward from the plunger barrel bore 66 towards the hopper 60. A plunger paddle or head 70 serves as a lid for the hopper 60. The hopper 60 is generally curved to mate loosely with the plunger 62 as it rotates about the first pivot pin 64. A lever 72 is rotatably affixed to the middle portion of the plunger arm 68 by a second pivot pin 74 passing through a plunger lever bore 76 and the lever plunger bore 78. The first and second pivot pins 64, 74 have rotational axes that are generally parallel to the rotational axis of the drum 10. The lever grip 80 extends away from the barrel 12. The other end, extending in the opposite direction, is curved to form a lever bearing 82. The lever bearing 82 engages a barrel arm bearing wall 84 affixed to the barrel arm 56 such that when the plunger paddle 70 approaches the hopper 60, the user's pressing of the grip end of the lever 72 towards the barrel arm 56 rotates the lever bearing 82 against the lever wall 84, pulling the plunger 62 down into the hopper 60 and pushing the contents into the grating drum 10.

In the first illustrative embodiment, referring again to FIGS. 1, 6, and 7, it can be seen that the hand-held rotary grater 100 comprises the drum 10 rotating within the barrel 12 which is surmounted by the hopper 60, with the barrel arm 56 (e.g., the first lever) extending at roughly right angles to both the hopper 60 and drum 10. The plunger arm 68 (e.g., the second lever) is hinged to the far end of the barrel arm 56, and bears the plunger head 70 positioned and curved to mate with the drum 10 when fully engaged. The lever 72 (e.g., the third lever), rotatably affixed to the middle of the plunger arm 68 (e.g., the second lever), engages at one end with a lever wall 84 of the grater body 14. When the far end of the lever 72 is compressed, the lever 72 pulls up on said lever wall 84, the central portion of the lever 72 thereby presses the plunger head 70 down into the drum 10. The lever 72, pinned to the central portion of the plunger arm 68 and constrained on either side by the barrel arm 56, in turn constrains the plunger arm 68, effectively shortening it and preventing the curved plunger wall of the plunger head 70 from twisting into the path of the rotating blades of the drum 10. The face of the plunger head 70 is formed into mounds and/or voids that inhibit lateral movement of a workpiece (e.g., a block of cheese) placed in the hopper 60. The crank 28 is removably affixed to one side of the drum 10 in such a way that it can be reaffixed on the opposite side, or reaffixed in reverse with the handle 44 facing inwardly to minimize the space required for storage of the grater 100. The retainer ring 26, interchangeable with the crank 28, is affixed in the same manner, constraining the drum 10 between the crank 28 and the lock ring 26. The method of attachment is designed so as to be sturdy, but simply molded.

In the first illustrative embodiment, the end-lever fulcrum is retained for its even pressure on the workpiece, while the mid-lever fulcrum is added to increase mechanical advantage. The grip of the user presses the far end of the lever 72 against the hinge-end of the plunger arm 68, while the near end hooks under a wall 84 affixed to the central portion of the barrel arm 56. A further advantage of this design is that the lever 72, attached to the central portion of the plunger arm 68 and constrained between vertical walls of the barrel arm 56, effectively shortens the reach of the plunger 62, effectively halving its length in terms of torsional flex, and exerting pressure in a generally uniform manner, even on an irregularly-shaped workpiece. The lever 72, rotatably coupled to the central portion of the plunger arm 68 and pulling upon the barrel arm 56 via the bearing wall 84 for greater advantage, enhances the force of the user's hand so as to increase the pressure of the workpiece against the rotating grating drum with less fatigue on the user.

In the first illustrative embodiment, the hand-held rotary grater 100 can be used for hard dry materials such as hard cheese, chocolate, and nuts. With the exception of the toothed drum 10 of the grater, the grater 100 can be molded of stiff plastic, such as acrylonitrile butadiene styrene (ABS) or polycarbonate. The toothed drum 10 or blades can be made of stainless-steel that is approximately 0.3 mm thick, mounted on a plastic cage.

In the first illustrative embodiment, the lever assembly of the grater 100 is held together by two metal pins 64, 74. The plunger 62 is designed to be molded in an upper and lower two-part mold with slides defining the pin bores. The grater 100 may have an approximately 40 mm diameter grating drum 10.

Now, with reference to FIGS. 1, 2, and 6-9, an exemplary operation of the first illustrative embodiment of the grater 100 will be described. For left-handed users, the grater 100 is assembled by sliding the crank 28 onto the drum frame (upon which the drum 10 is permanently mounted) and turning it to the left. The frame is then inserted from the left into the barrel 12. The retainer ring 26 is then slid onto the other end of the drum frame and rotated in the opposite direction. Then, holding the hopper 60 in one hand, user then lifts the lever 72 with the other. The lever 72 withdraws the plunger head 70 from the hopper 60. After inserting the workpiece entirely into the hopper 60 (e.g., making sure the workpiece does not protrude), the user, holding the lever 72 by the grip 80, so the lever 72 hangs roughly straight down, drops the lever 72, bringing the plunger head 70 down on the workpiece. Then, compressing the grip 80 of the lever 72 against the barrel arm 56 with the right hand causes the opposite end to pull up on the barrel lever bearing wall 84 as the center of the lever 72 pushes down on the plunger 62. This urges the workpiece into the blades of the drum 10, which the user advances by turning the crank 28 with the left hand.

In one or more illustrative embodiments, the crank ring 28 and retainer ring 26 can be exchanged for left-handed and right-handed users of the grater 100.

In one or more illustrative embodiments, the rotary grater comprises a bayonet-mount grating drum in which the drum and crank are both flexible cylinders, interlocking through shallow male and female members that are sprung together by the flexible rings.

Figure 4:
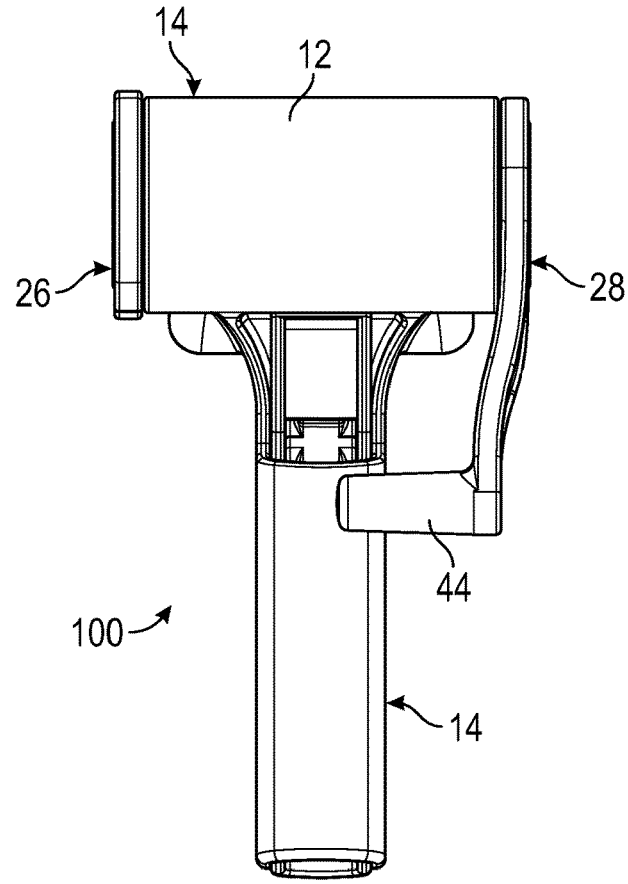
FIG. 4 is a bottom view of the hand-held rotary grater of FIG. 1, wherein the handle of the grater crank is disposed on a left side of the grater in an inverted grater storage position.
Figure 5:
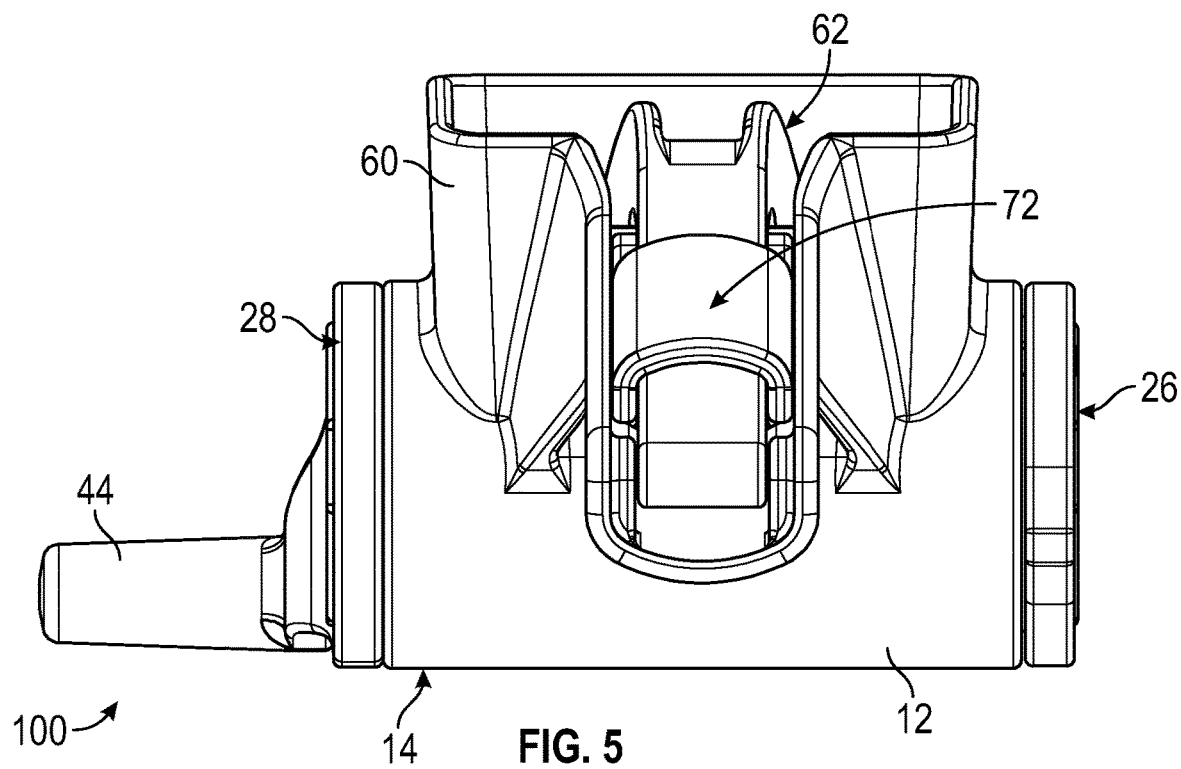
FIG. 5 is a rear view of the hand-held rotary grater of FIG. 1, wherein the handle of the grater crank is disposed on a left side of the grater in an operative position.
Figure 22:
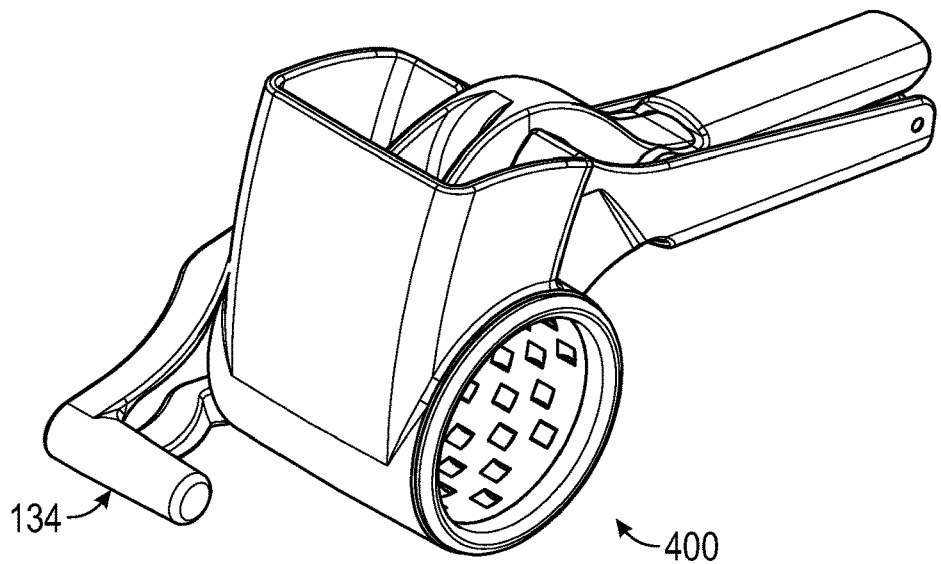
FIG. 22 is a three-quarter perspective view of an upper front left side of the hand-held rotary grater of FIG. 20, wherein the grater is depicted at the end of the compression stroke with the handle of the grater crank disposed on a right side of the grater in an inverted grater storage position.
Figure 23:
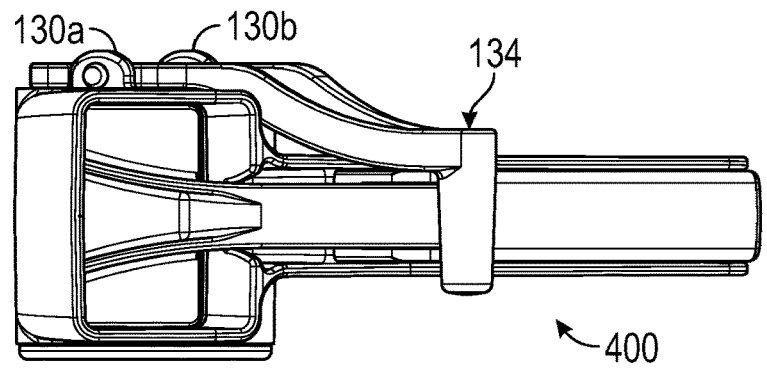
FIG. 23 is a top view of the hand-held rotary grater of FIG. 20, wherein the grater is depicted at the end of the compression stroke with the handle of the grater crank disposed on a right side of the grater in an inverted grater storage position.
Figure 24:
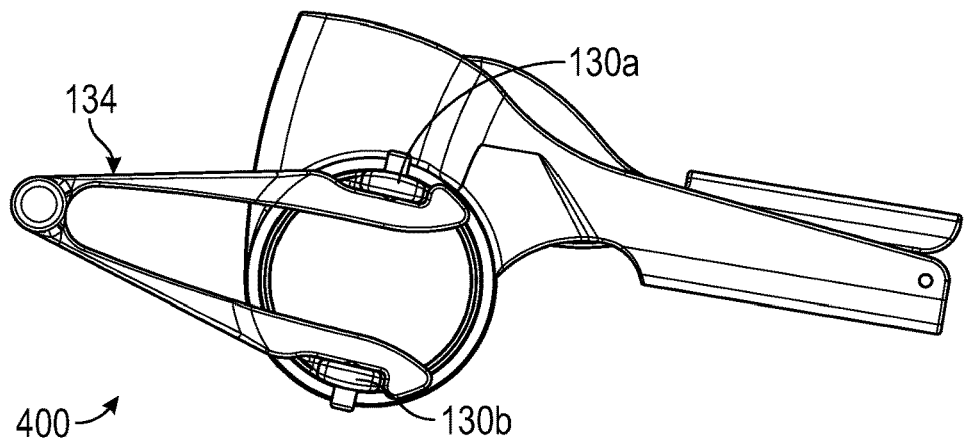
FIG. 24 is a left side view of the hand-held rotary grater of FIG. 20, wherein the grater is depicted at the end of the compression stroke with the handle of the grater crank disposed on a left side of the grater in an operative position.
Figure 25:
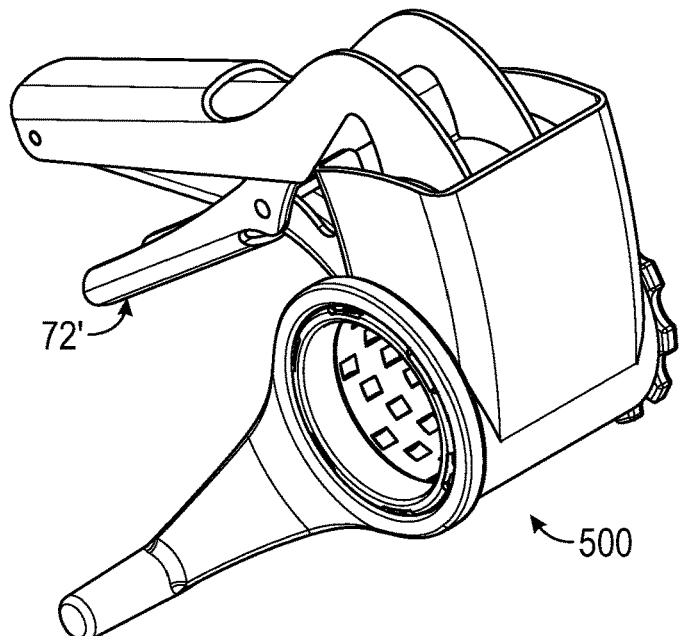
FIG. 25 is a three-quarter perspective view of an upper front right side of a hand-held rotary grater, according to a fifth illustrative embodiment, wherein the grater is depicted at the end of the compression stroke with the handle of the grater crank disposed on a right side of the grater in an operative position.
Figure 26:
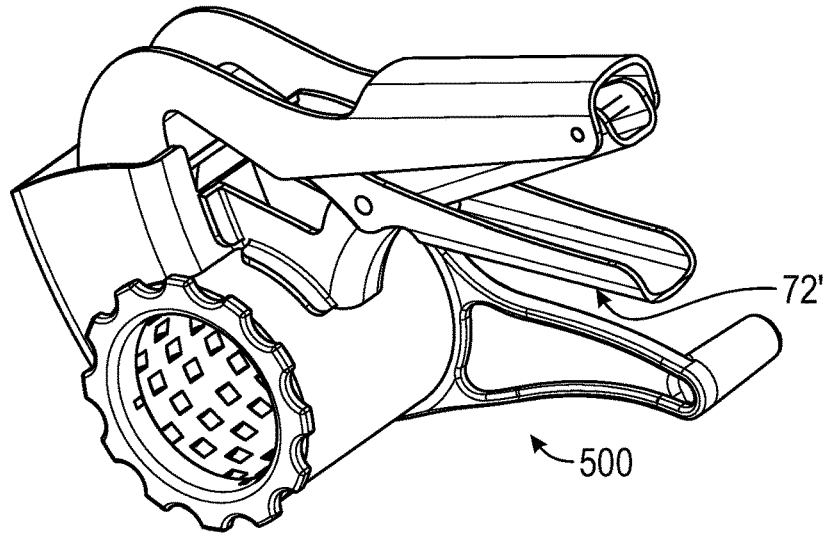
FIG. 26 is a three-quarter perspective view of an upper rear left side of the hand-held rotary grater of FIG. 25, wherein the grater is depicted at the end of the compression stroke with the handle of the grater crank disposed on a right side of the grater in an operative position.
Figure 27:
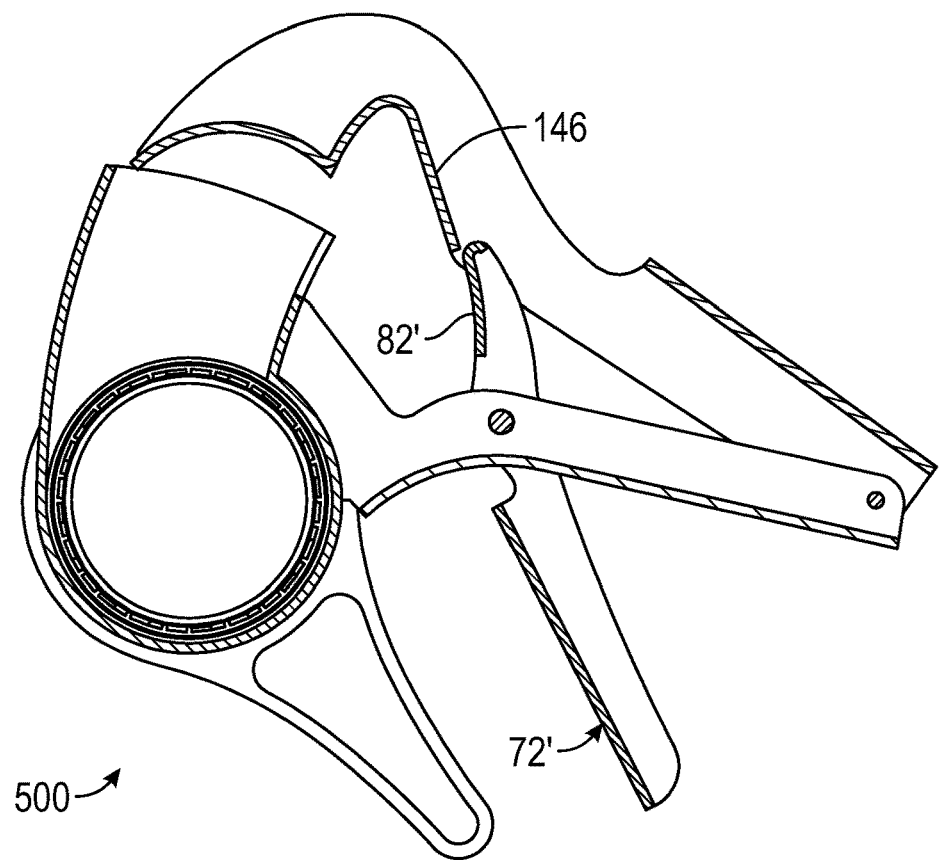
FIG. 27 is a cross-sectional left-side view of the hand-held rotary grater of FIG. 25, wherein the grater plunger has been raised for loading of a workpiece.
Figure 28:
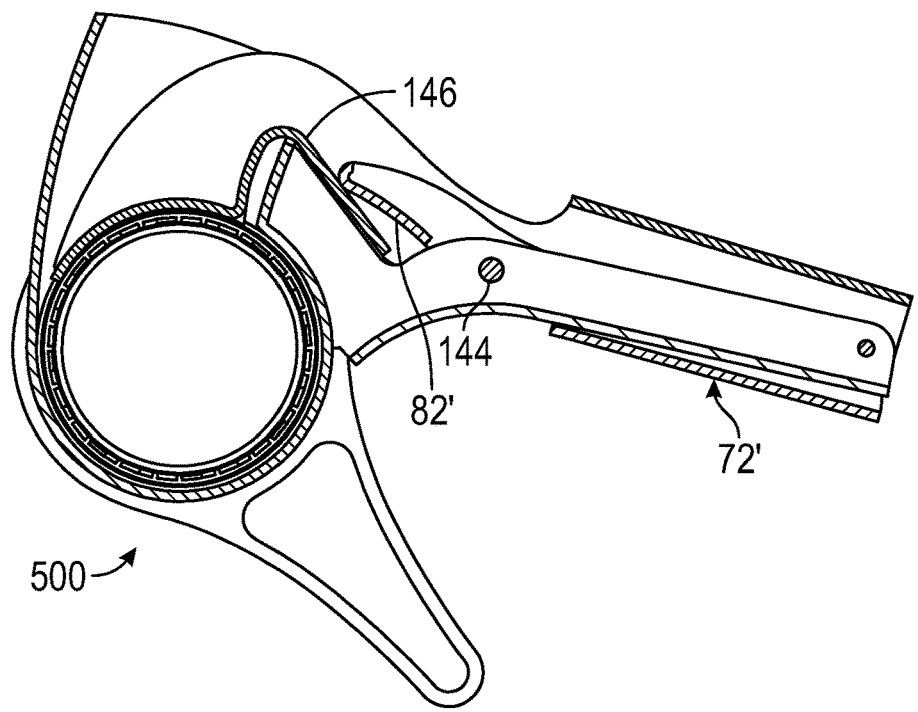
FIG. 28 is another cross-sectional left-side view of the hand-held rotary grater of FIG. 25, wherein the grater is depicted at the end of the compression stroke.
Figure 29:
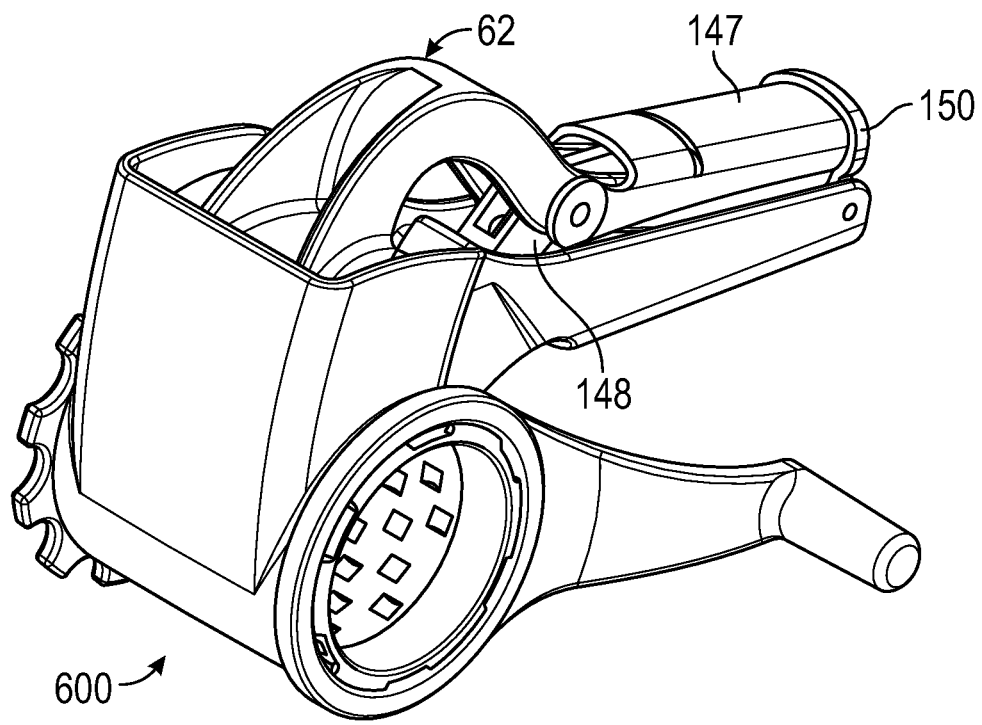
FIG. 29 is a three-quarter perspective view of an upper front left side of a hand-held rotary grater, according to a sixth illustrative embodiment, wherein the handle of the grater crank is disposed on a left side of the grater in an operative position.
Figure 30:
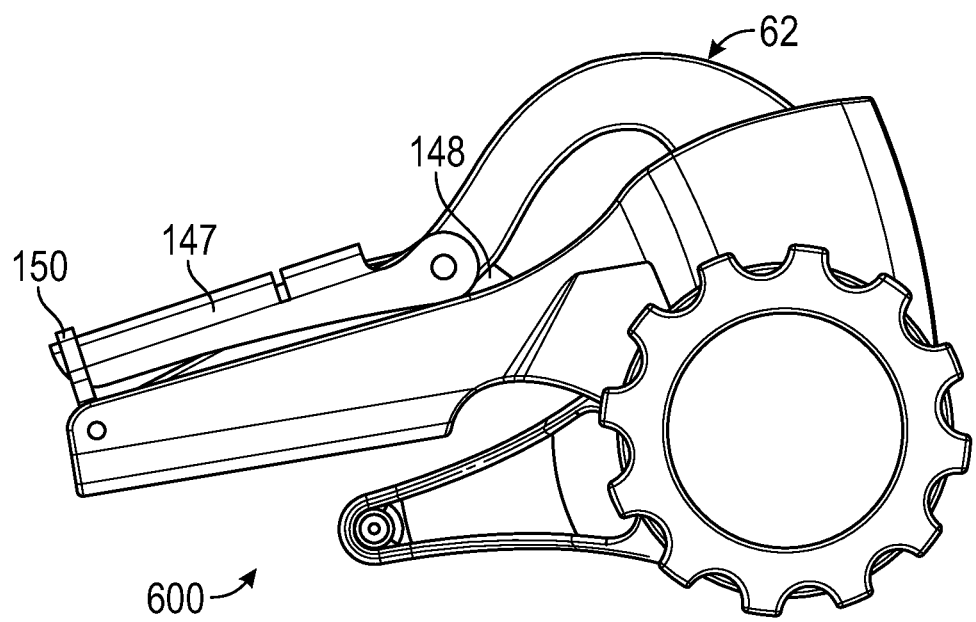
FIG. 30 is a right-side view of the hand-held rotary grater of FIG. 29, wherein the handle of the grater crank is disposed on a left side of the grater in an operative position.
Figure 31:
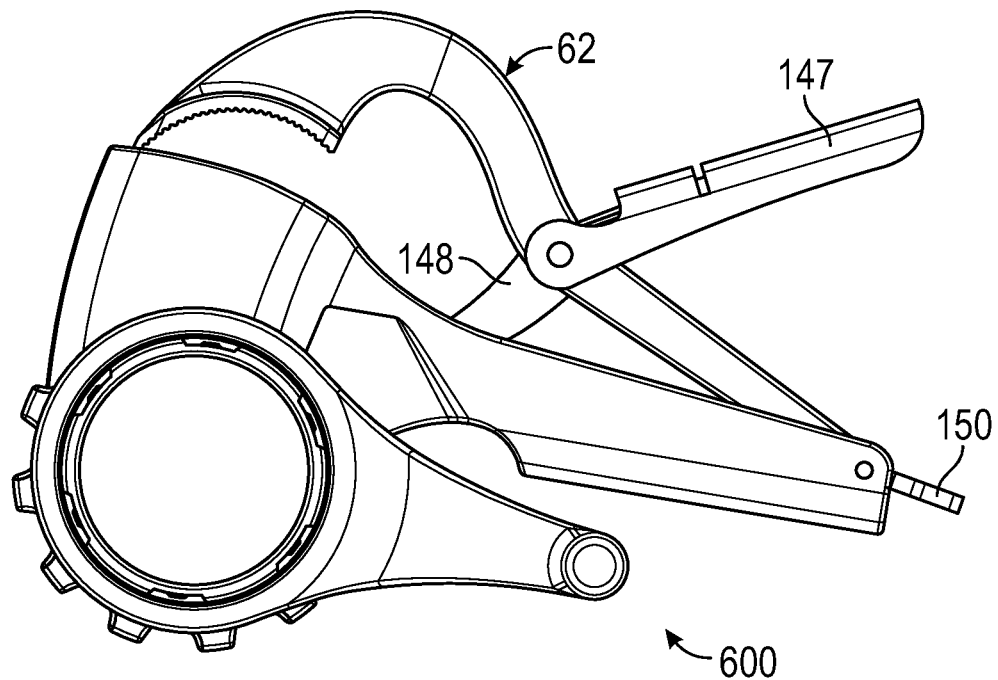
FIG. 31 is a left-side view of the hand-held rotary grater of FIG. 29, wherein the handle of the grater crank is disposed on a left side of the grater in an operative position, and the grater plunger has been raised for loading of a workpiece.
Figure 32:
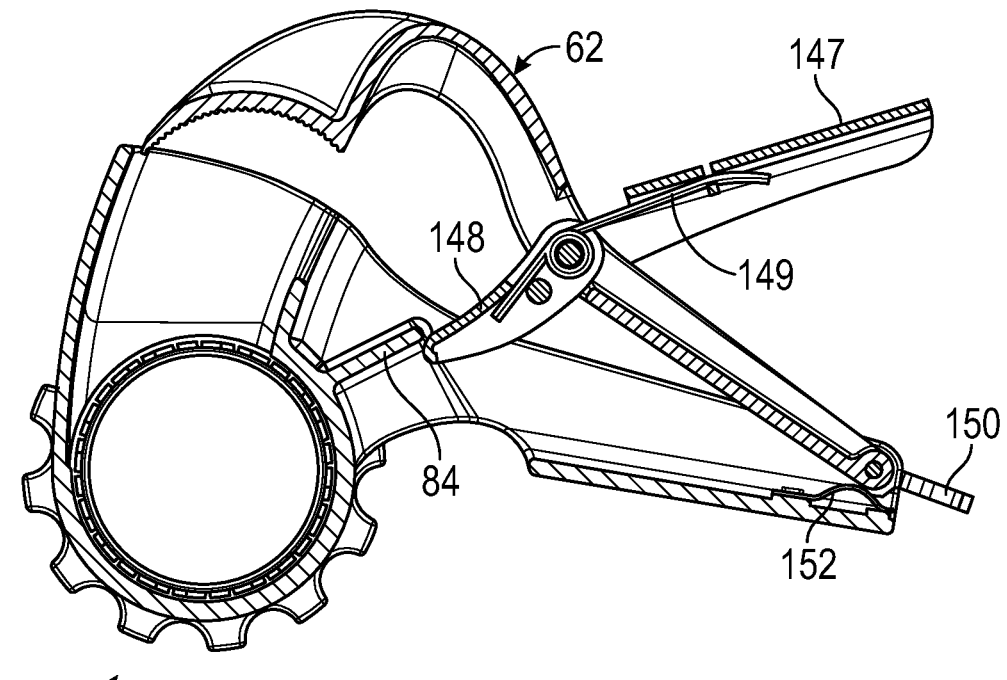
FIG. 32 is a cross-sectional left-side view of the hand-held rotary grater of FIG. 29, wherein the grater plunger has been raised for loading of a workpiece.
Figure 33:
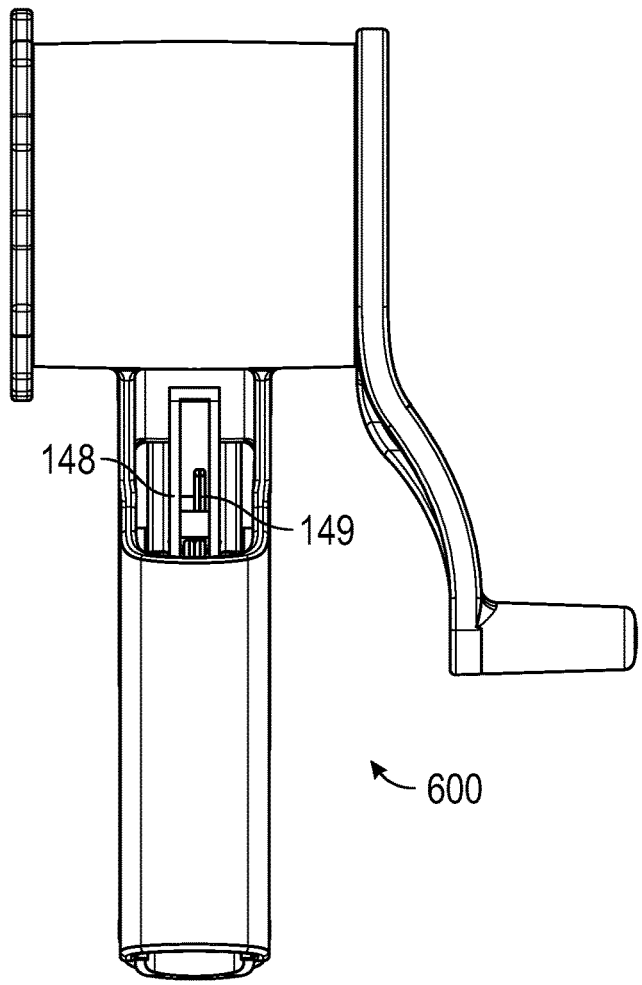
FIG. 33 is a bottom view of the hand-held rotary grater of FIG. 29, wherein the handle of the grater crank is disposed on a left side of the grater in an operative position.
Figure 34:
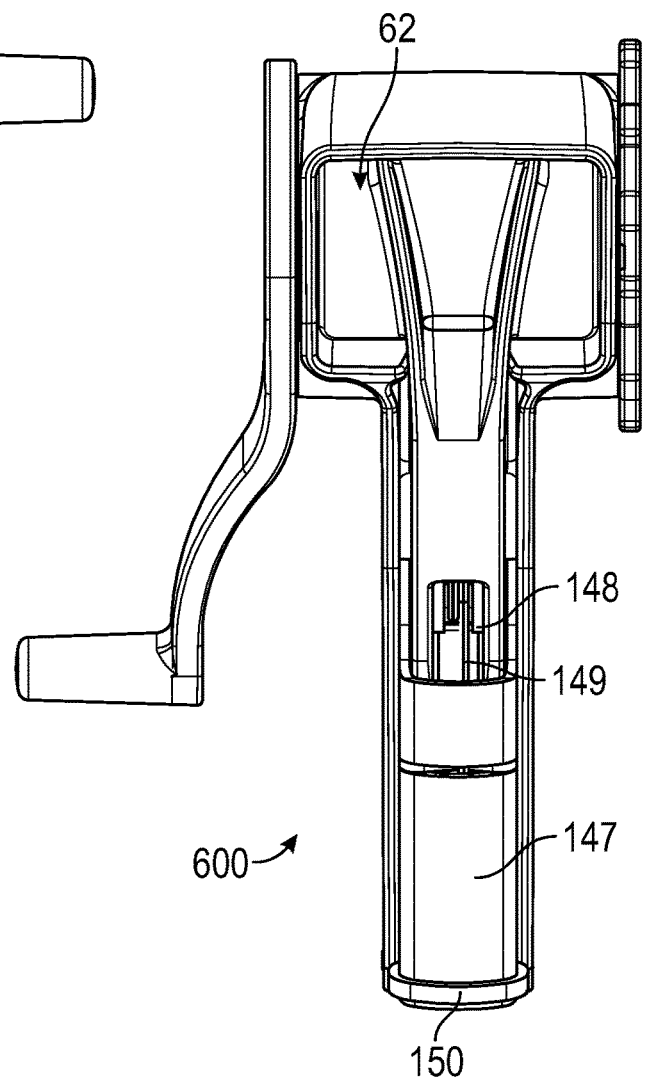
FIG. 34 is a top view of the hand-held rotary grater of FIG. 29, wherein the handle of the grater crank is disposed on a left side of the grater in an operative position.
Figure 35:
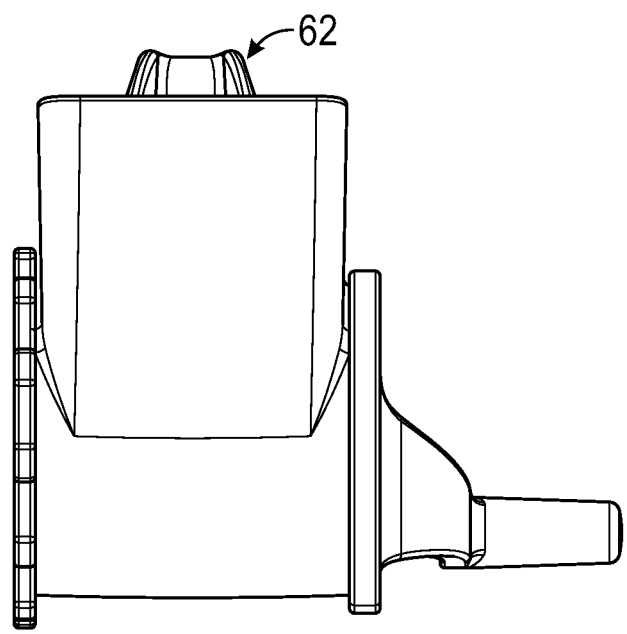
FIG. 35 is a front view of the hand-held rotary grater of FIG. 29, wherein the handle of the grater crank is disposed on a left side of the grater in an operative position.
Figure 36:
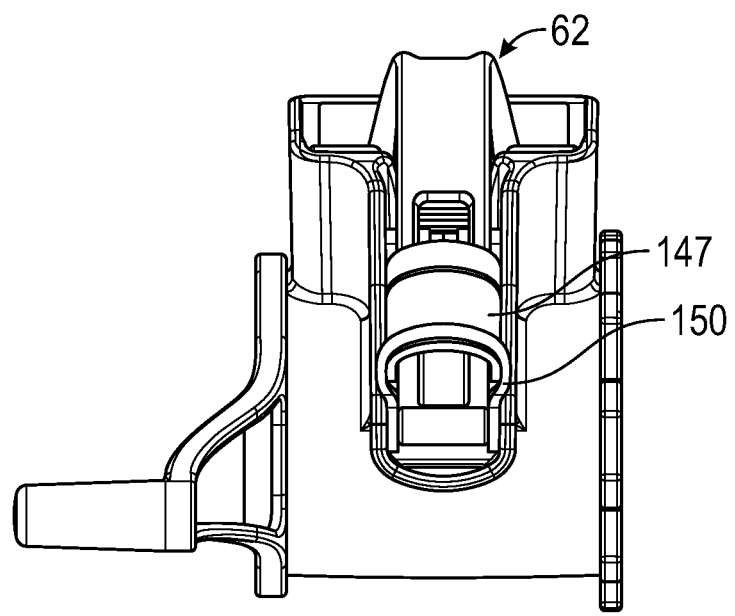
FIG. 36 is a rear view of the hand-held rotary grater of FIG. 29, wherein the handle of the grater crank is disposed on a left side of the grater in an operative position.
Figure 37:
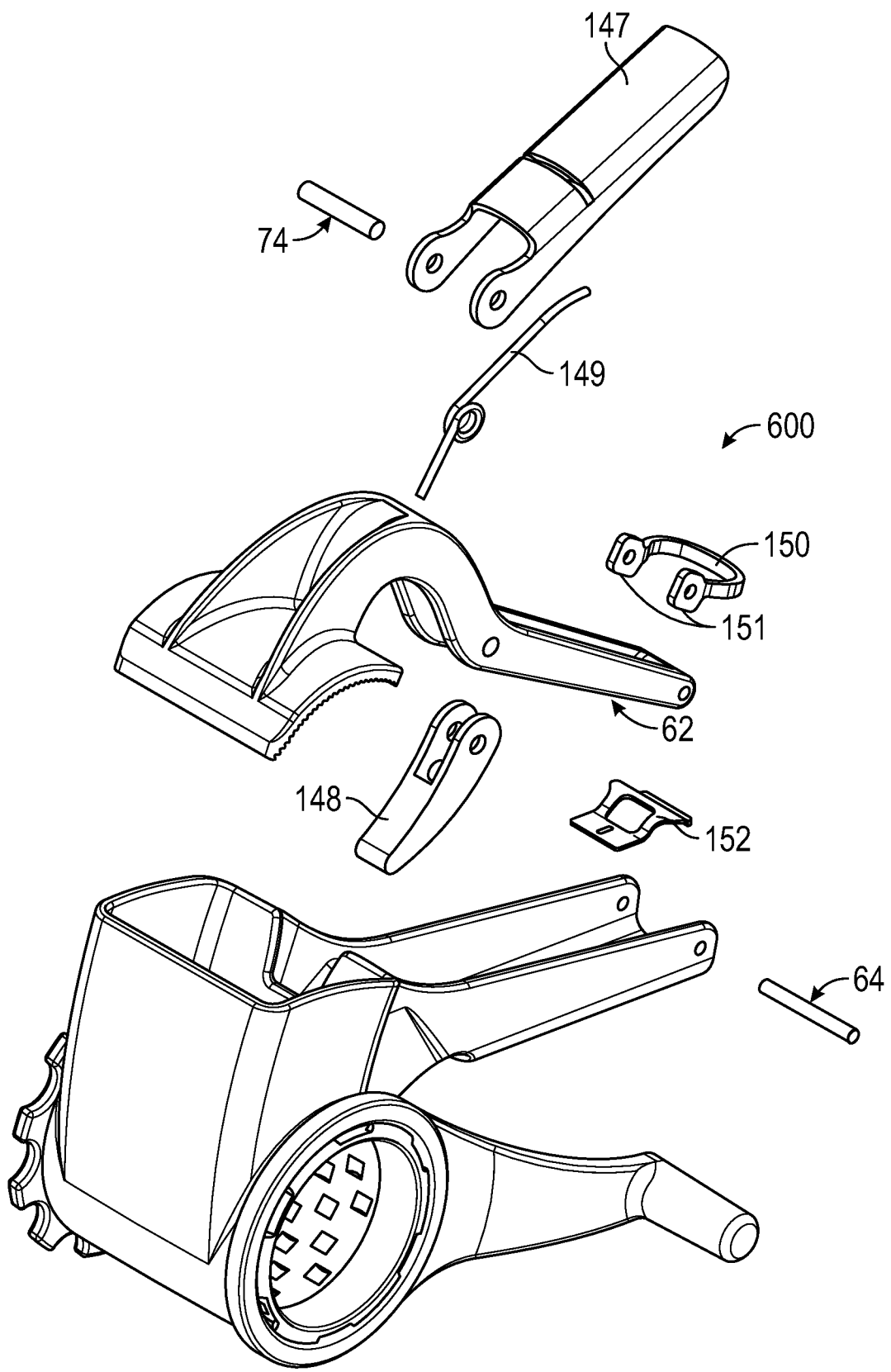
FIG. 37 is an exploded three-quarter perspective view of an upper front left side of the hand-held rotary grater of FIG. 29, wherein the handle of the grater crank is disposed on a left side of the grater in an operative position.

Also, in one or more illustrative embodiments, with reference to FIGS. 4, 22, and 23, the crank 28 can be inverted to reduce overall storage space requirements.

In the second to fifth illustrative embodiments described hereinafter, the small diameter barrel bearing 38 is eliminated and both drum bearings are large diameter.

A second illustrative embodiment of the hand-held rotary grater is seen generally at 200 in FIGS. 11-14. Referring to these figures, it can be seen that, in many respects, the second illustrative embodiment is similar to the first illustrative embodiment. Moreover, many elements are common to both such embodiments. For the sake of brevity, the elements that the second embodiment of the hand-held rotary grater has in common with the first embodiment will not be discussed because these components have already been described above.

In the second illustrative embodiment, referring to FIGS. 10-14, it can be seen that the separate first and second pivot pins 64, 74 are replaced by pins integrated into the other parts: a plunger arm pin 86a, 86b and a lever plunger pin 88.

The plunger arm pins 86a, 86b have plunger pin flats 90a, 90b, and the lever plunger pins 88 have lever pins flats 92a, 92b on opposite sides. This permits them to slide through narrow channels: the barrel arm channels 94a, 94b (refer to FIG. 13) and plunger arm channels 96 on the plunger 62' (see FIG. 12), before being rotated snugly into the bores.

Figure 12:
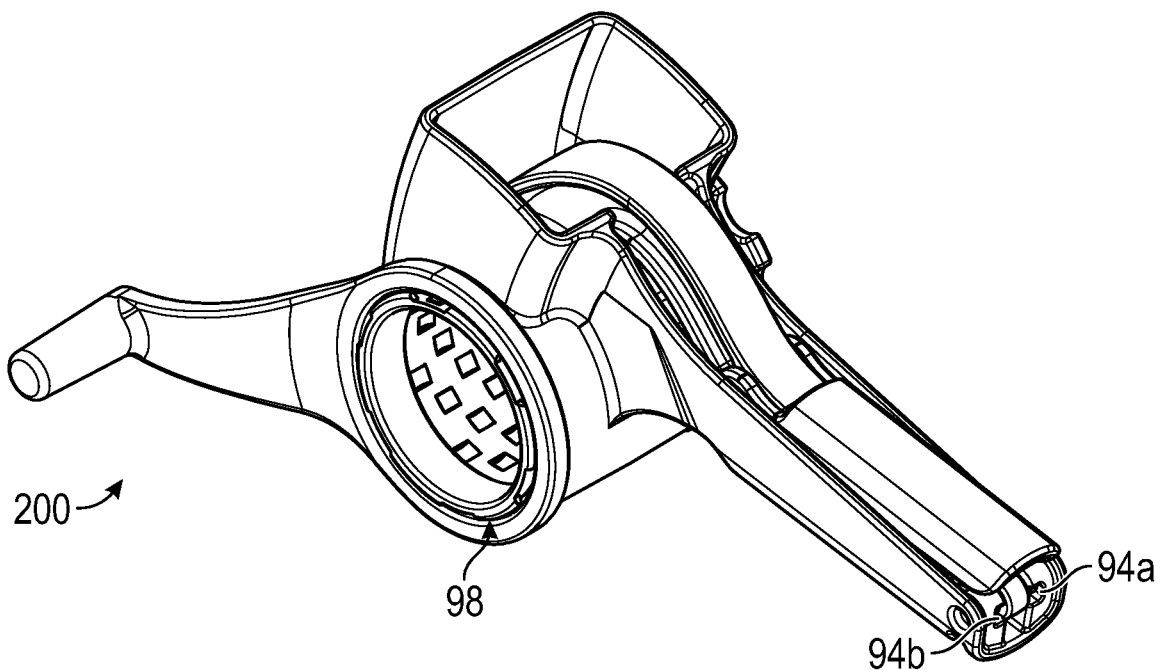
FIG. 12 is a three-quarter perspective view of an upper rear left side of the hand-held rotary grater of FIG. 11, wherein the handle of the grater crank is disposed on a left side of the grater in an operative position.
Figure 13:
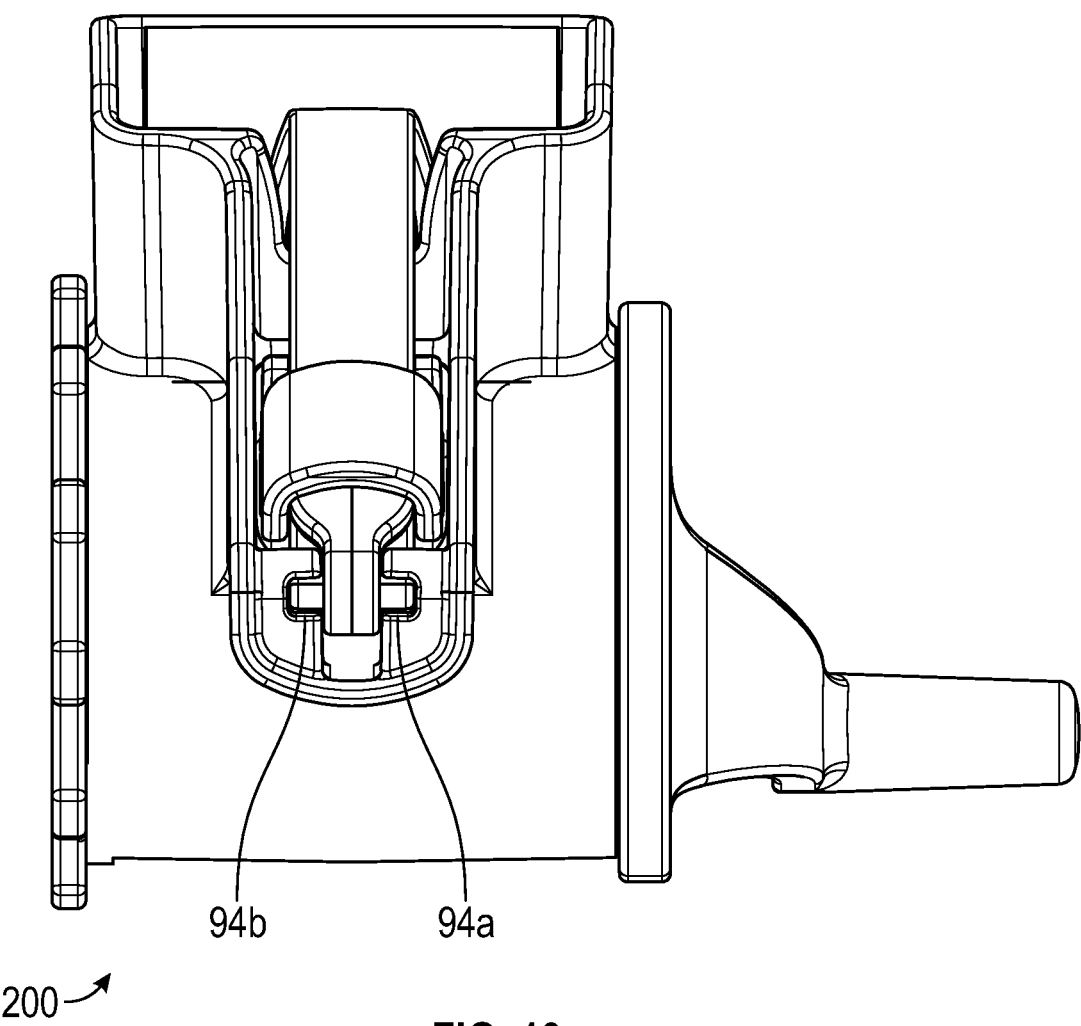
FIG. 13 is a rear view of the hand-held rotary grater of FIG. 11, wherein the handle of the grater crank is disposed on a right side of the grater in an operative position.
Figure 14:
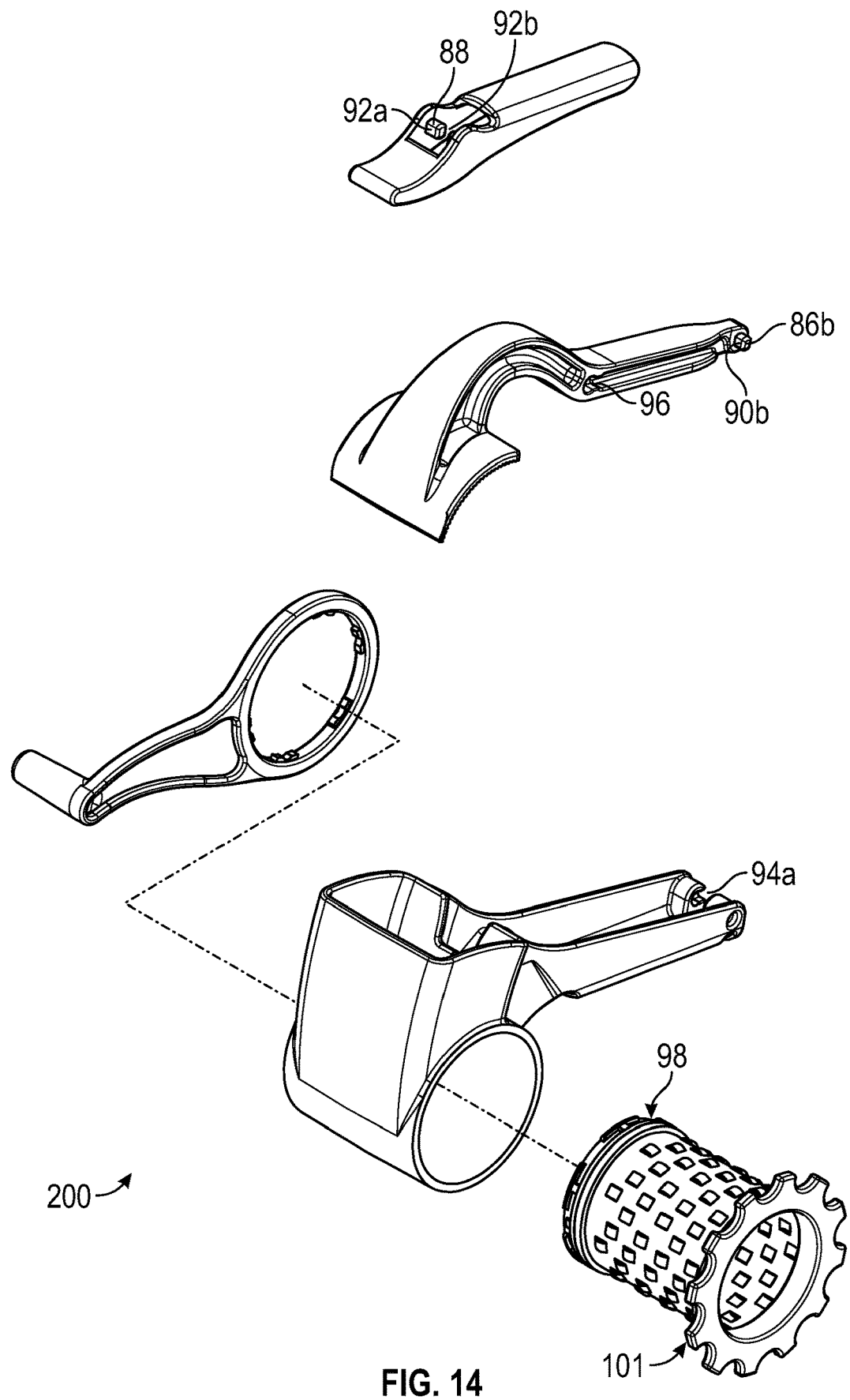
FIG. 14 is an exploded three-quarter perspective view of the upper front left side of the hand-held rotary grater of FIG. 11, wherein the handle of the grater crank is disposed on a right side of the grater in an operative position.
Figure 15:
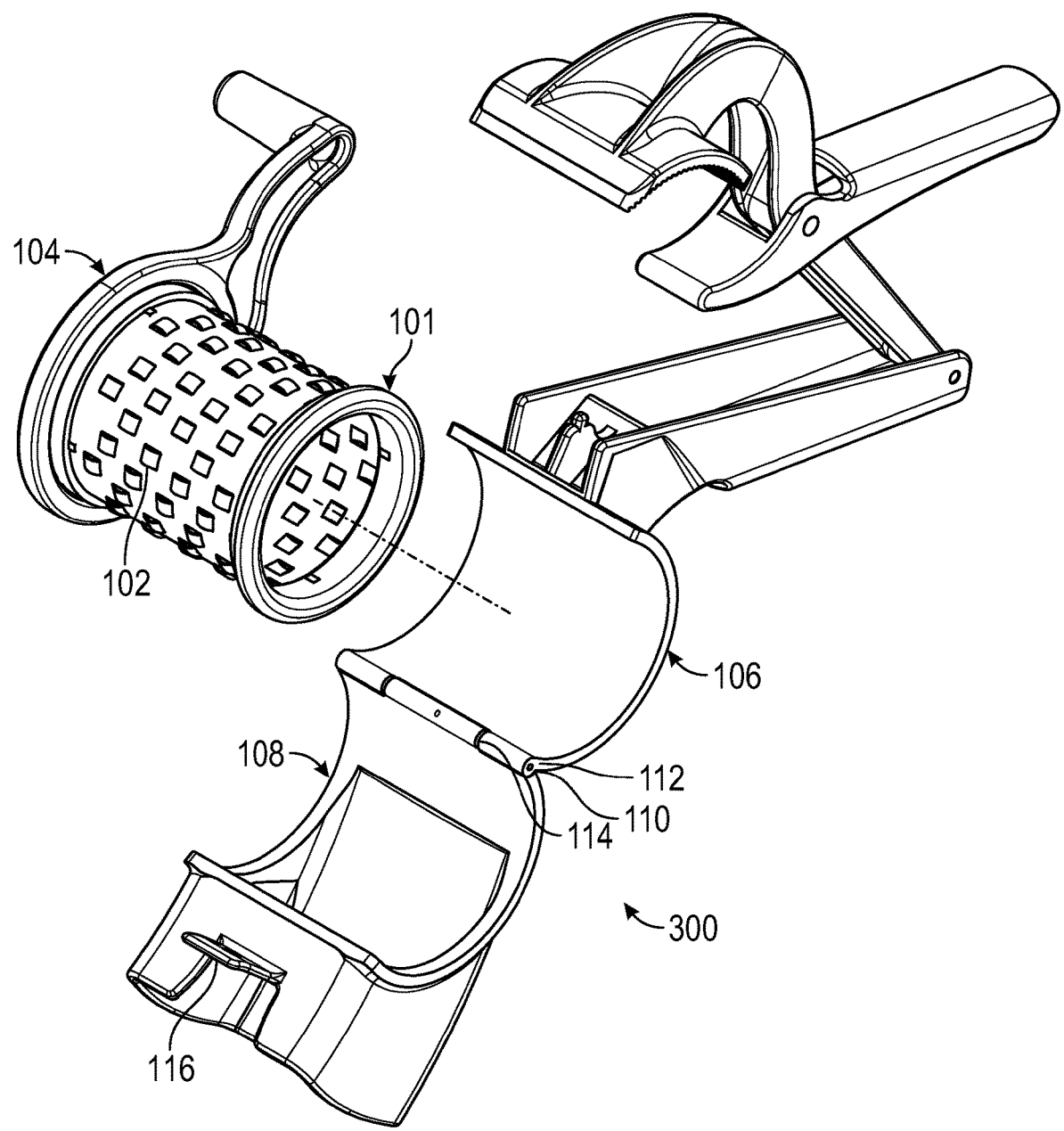
FIG. 15 is a three-quarter perspective view of an upper front left side of a hand-held rotary grater, according to a third illustrative embodiment, wherein the handle of the grater crank is disposed on a right side of the grater in an operative position, and the loading of the one-piece drum assembly is illustrated.

With reference to FIGS. 12, 14, and 15, in the second through fifth illustrative embodiments, the drum frame is molded onto the drum and the support ribs eliminated. The result is a half drum frame 98 (see FIG. 14).

As shown in FIGS. 11, 14, 15, 20-23, 25, 26, the bayonet-mount half drum frame may be employed on both ends of the drum or the frame and retainer can be integrated into a half drum frame with a lip 101. With the latter arrangement, the drum must be flipped to accommodate left-handers and right-handers, so bidirectional blades 102 must be employed.

In the second illustrative embodiment, the hand-held rotary grater 200 can be used for soft cheeses and vegetables, such as carrots, zucchini, and potatoes. The grater 200 may have an approximately 52 mm diameter grating drum. The grating teeth or blades face in opposite directions, so that the drum can be flipped end-to-end. The retaining ring can then be integrated into the drum. Stress is spread over a wider drum, so the supporting ribs can be dispensed with the wider drum.

In the second illustrative embodiment, the plunger arm and the lever of the hand-held rotary grater 200 may have integral plastic pins 86a, 86b, 88 molded into these components. The plunger may be designed to be molded in left and right molds, with possibly a third mold defining the bottom of the plunger.

Figure 16:
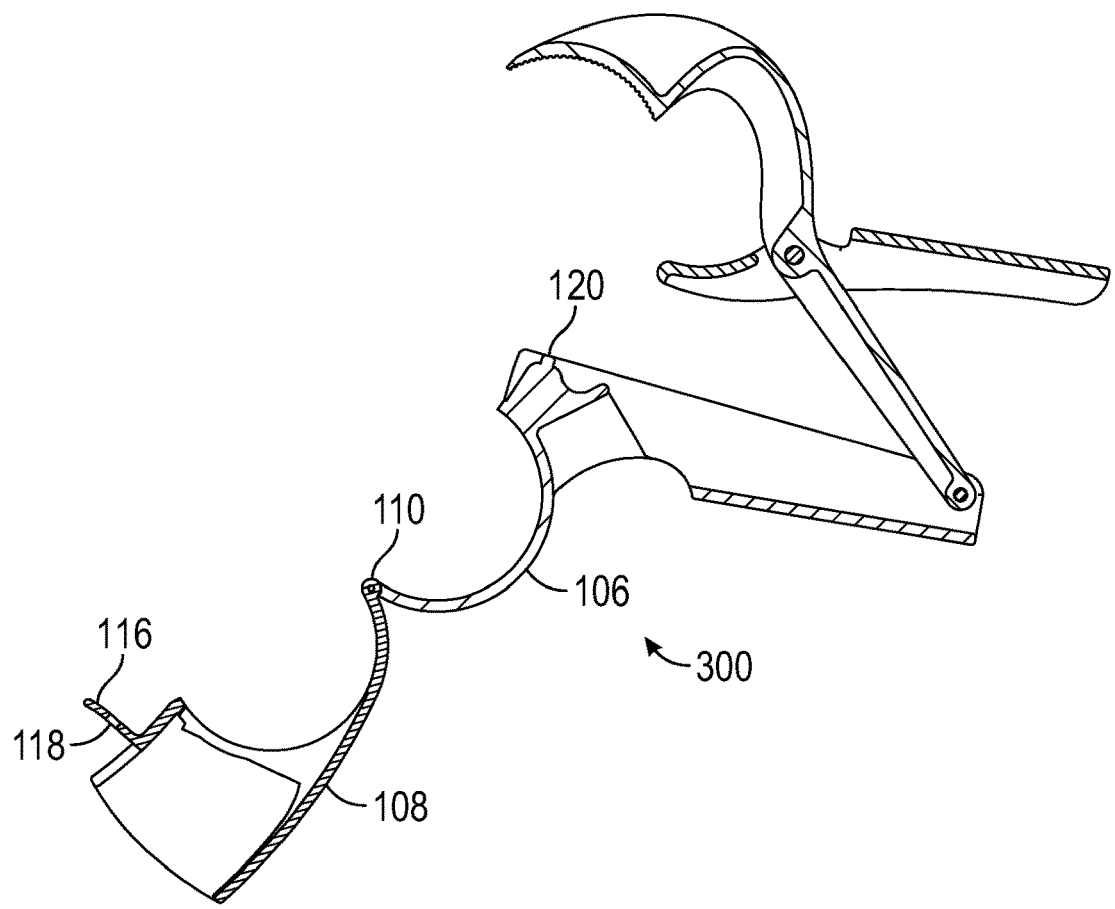
FIG. 16 is a cross-sectional left-side view of the hand-held rotary grater of FIG. 15, wherein the housing of the grater is open for the loading of the drum.
Figure 17:
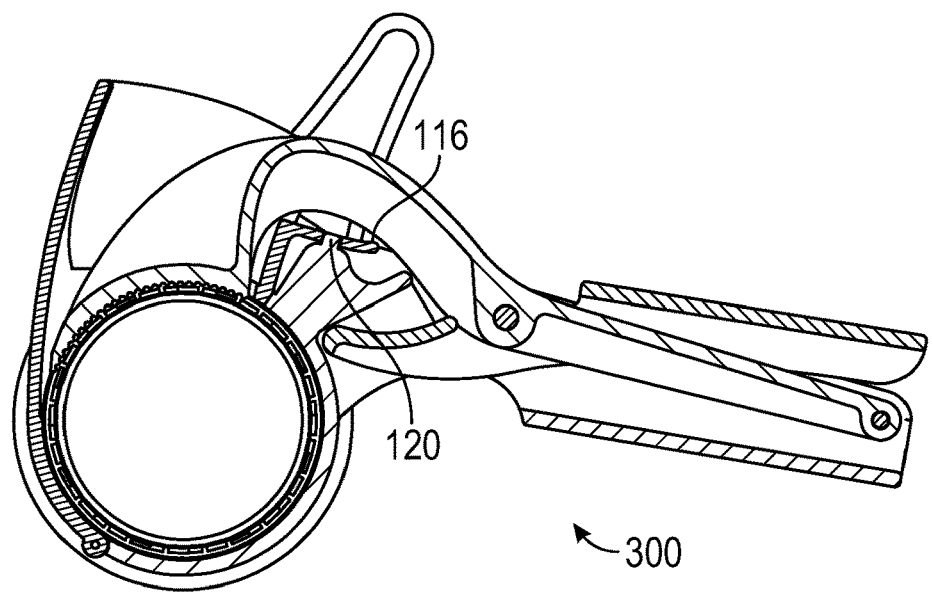
FIG. 17 is a cross-sectional left-side view of the hand-held rotary grater of FIG. 15, wherein the housing of the grater is depicted in a closed position, the grater is depicted at the end of the compression stroke, and the handle of the grater crank is disposed on a right side of the grater in an operative position.

A third illustrative embodiment of the hand-held rotary grater is seen generally at 300 in FIGS. 15-17. Referring to these figures, it can be seen that, in many respects, the third illustrative embodiment is similar to the first and second illustrative embodiments. Moreover, many elements are common to all of the embodiments. For the sake of brevity, the elements that the third embodiment of the hand-held rotary grater has in common with the first and second embodiments will not be discussed because these components have already been described above.

In the third illustrative embodiment, referring to FIG. 15, the half drum frame and crank can be permanently joined to become a new part, the half drum frame with crank 104. In this embodiment, the barrel can be split in half to remove and reinsert the drum, so the crank and ring can be permanently integrated and grip nubs deleted, but that would eliminate the ability to invert the crank for storage. In the third illustrative embodiment, the barrel of the grater 300 is split in two. As will be described hereinafter, the barrel is hinged on one side and snaps together on the other side.

Referring to FIGS. 15 and 20-24, if it is not necessary to twist the retainer against the crank, the grip nubs can be eliminated.

In the third illustrative embodiment, with reference to FIGS. 15-17, the complete grater body is separated into the grater arm body 106 and the grater hopper body 108. The body portions 106, 108 are rotatably joined by a hinge pin 110 passing through a grater arm bore 112 and a grater hopper bore 114. On the opposite side of the barrel from the hinge pin 110, a grater arm snap tab 116 has a grater arm snap cavity 118 that snaps onto a snap bolt or pin 120 mounted on the barrel lever bearing wall to join the two halves together. Together the arm snap tab 116 with the arm snap cavity 118 and the snap bolt or pin 120 form a type of securement device.

Figure 18:
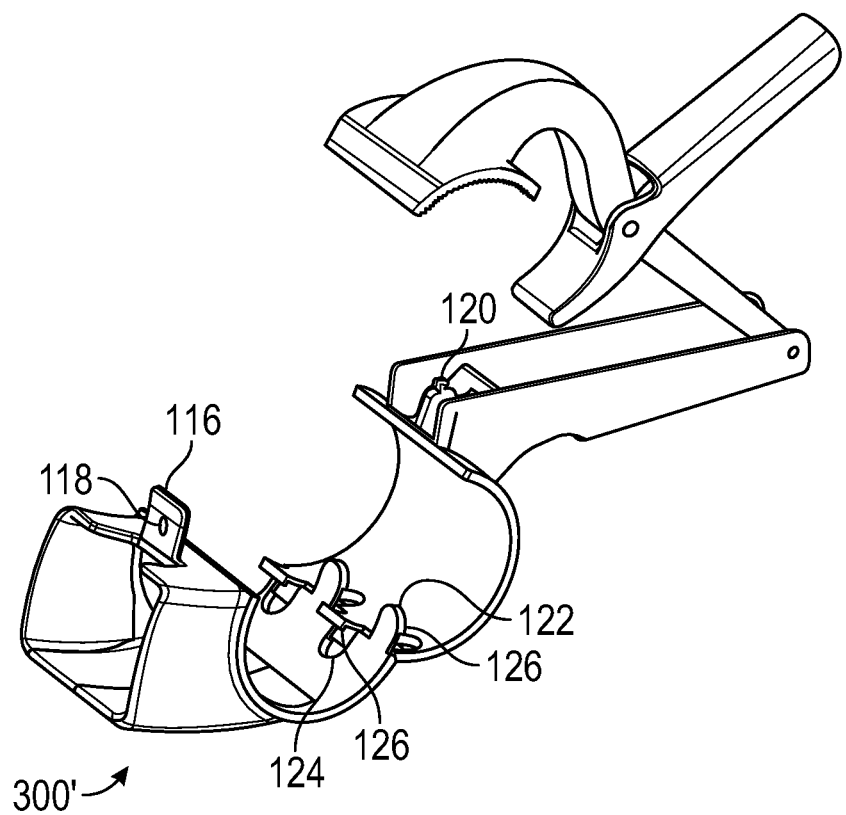
FIG. 18 is a three-quarter perspective view of an upper rear left side of an alternative version of the third illustrative embodiment of the hand-held rotary grater, wherein the housing of the grater is in an open position for the loading of the drum.
Figure 19:
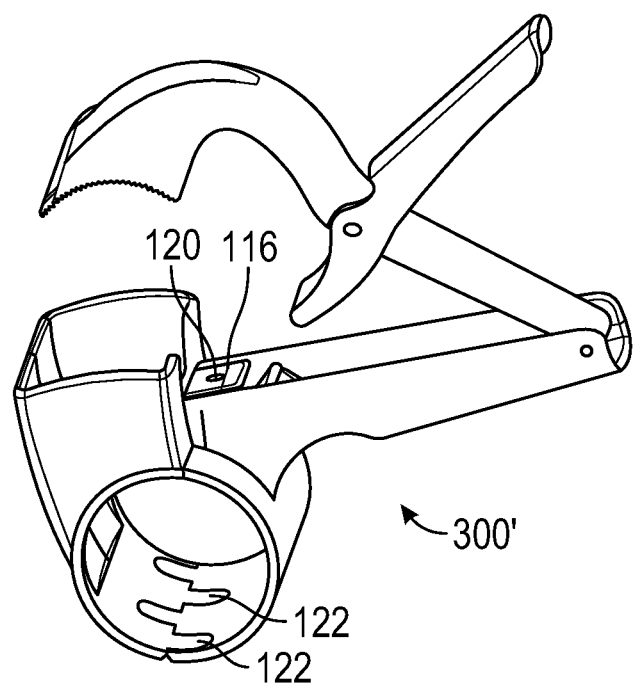
FIG. 19 is a three-quarter perspective view of a left side of the hand-held rotary grater of FIG. 18, wherein the housing of the grater is depicted in a closed position without the drum.

A modified version of the third illustrative embodiment of the hand-held rotary grater is depicted in FIGS. 18 and 19. In these figures, the grater arm body of the hand-held rotary grater 300' is modified by its two halves being joined, not by a hinge, but by interlock tabs 122 mated to interlock channels 124 held by interlock barbs 126.

A fourth illustrative embodiment of the hand-held rotary grater is seen generally at 400 in FIGS. 20-24. Referring to these figures, it can be seen that, in many respects, the fourth illustrative embodiment is similar to the preceding illustrative embodiments. Moreover, many elements are common to all of the embodiments. For the sake of brevity, the elements that the fourth embodiment of the hand-held rotary grater has in common with the preceding embodiments will not be discussed because these components have already been described above.

Figure 20:
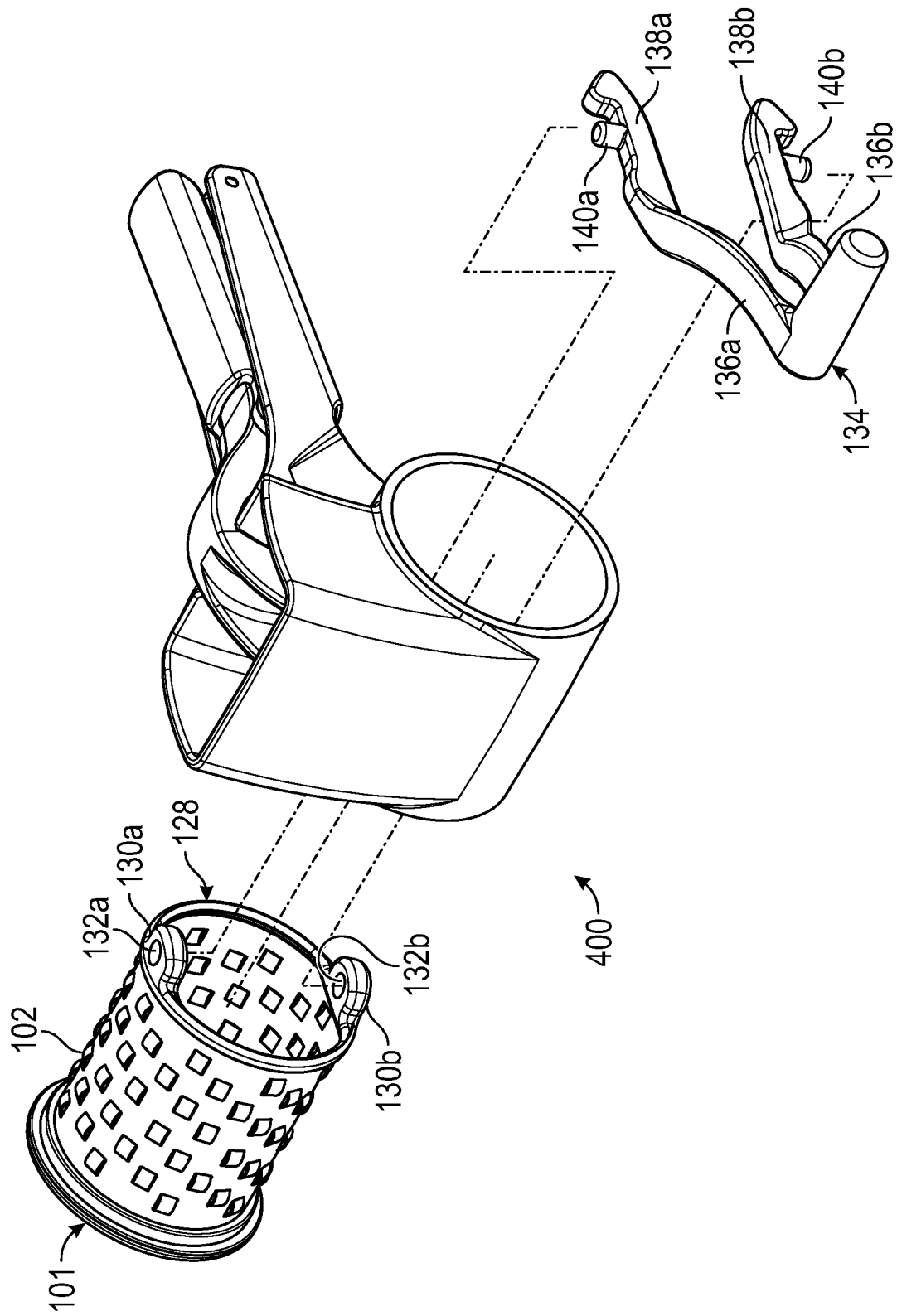
FIG. 20 is a three-quarter perspective view of an upper front left side of a hand-held rotary grater, according to a fourth illustrative embodiment, wherein the grater is depicted at the end of the compression stroke with an exploded drum assembly, and handle of the grater crank is poised to be mounted on the left side of the grater in an operative position.
Figure 21:
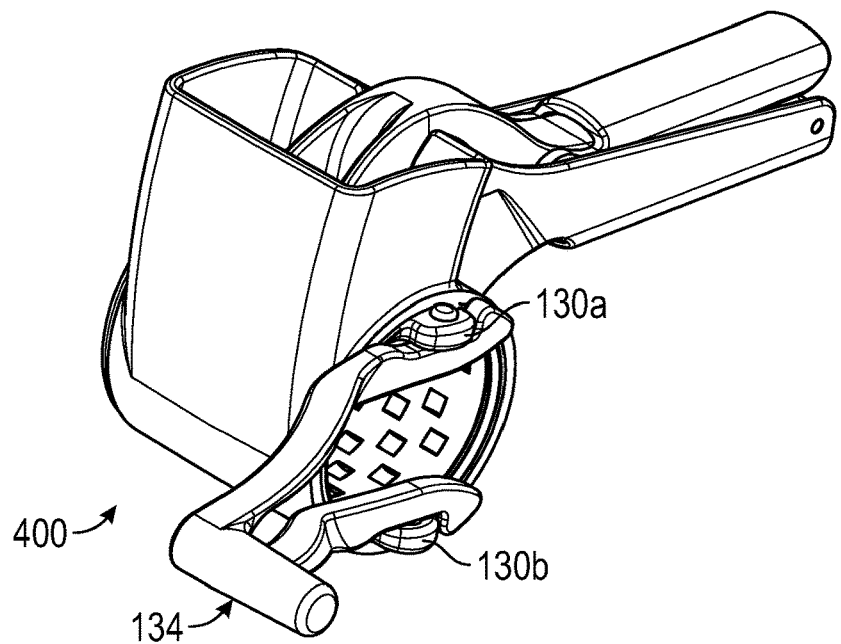
FIG. 21 is a three-quarter perspective view of an upper front left side of the hand-held rotary grater of FIG. 20, wherein the grater is depicted at the end of the compression stroke with the handle of the grater crank disposed on a left side of the grater in an operative position.

In the fourth illustrative embodiment, with reference to FIGS. 20-24, the bayonet-mount drum arrangement is replaced by a bail-type arrangement. On one end is a half frame with lip. On the other is a half frame with ears 128. A pair of diametrically opposed ears 130a, 130b that extend out parallel with the rotational axis are provided on half frame 128. Drum ear bores 132a, 132b are aligned on an axis normal to the central rotational axis of the drum. In the fourth embodiment, the crank 134 takes the form of a wishbone-shaped bail that springs outwards to lock into ears on the drum. More particular, as shown in FIG. 20, the wishbone-shaped crank 134 has a pair of wishbone struts 136a, 136b that end in parallel wishbone crank flanges 138a, 138b. Crank pins 140a, 140b extend out from the flanges 138a, 138b on a shared axis to mate with the bores in the ears 130a, 130b. Either side of the flanges 138a, 138b can act as thrust bearings. Pinching the wishbone struts 136a, 136b together withdraws the pins 140a, 140b from the drum ears so that the drum and/or crank can be flipped left-to-right.

A fifth illustrative embodiment of the hand-held rotary grater is seen generally at 500 in FIGS. 25-28. Referring to these figures, it can be seen that, in many respects, the fifth illustrative embodiment is similar to the preceding illustrative embodiments. Moreover, many elements are common to all of the embodiments. For the sake of brevity, the elements that the fifth embodiment of the hand-held rotary grater has in common with the preceding embodiments will not be discussed because these components have already been described above.

In the fifth illustrative embodiment, the lever 72' is rotatably attached to the barrel arm instead of the arm of the plunger. Likewise, the bearing wall 146 that the lever 72' pulls upon is located on the plunger arm instead of the barrel arm. More particularly, with reference to FIGS. 25-28, the lever 72' is pinned to the barrel arm at barrel arm lever bore 144, the lever bearing 82' pulling down on a plunger arm bearing wall 146. In the fifth illustrative embodiment, various components of the hand-held rotary grater 500 may be stamped from stainless-steel sheet.

A sixth illustrative embodiment of the hand-held rotary grater is seen generally at 600 in FIGS. 29-37. Referring to these figures, it can be seen that, in many respects, the sixth illustrative embodiment is similar to the preceding illustrative embodiments. Moreover, many elements are common to all of the embodiments. For the sake of brevity, the elements that the sixth embodiment of the hand-held rotary grater has in common with the preceding embodiments will not be discussed because these components have already been described above.

In the sixth illustrative embodiment, referring to FIGS. 29-37, the lever 72 (e.g., the third lever) of the previous illustrative embodiments can be divided into two parts, a hand lever 147 and an actuator lever 148 pivoting on the same pin 74. The hand lever 147 and the actuator lever 148 are joined by a tension spring 149 and together they are, for the purpose of initiating operation, identical in function to the lever 72 (e.g., the third lever above) described above. In the sixth illustrative embodiment, the hand-held rotary grater 600 includes the actuator lever 148 (e.g., a third lever) that connects the plunger arm (e.g., plunger second lever) to the barrel arm (e.g., the barrel/hopper first lever) between the plunger and hopper and the hand lever 147 (e.g., a fourth lever) that can be depressed and held in place by a bail 150 (serving as a locking member).

Once the plunger 62 engages the workpiece, however, the hand lever 147 can be depressed all the way against the barrel arm (e.g., the barrel/hopper first lever). This depression of the hand lever 147 winds up the tension spring 149, which can exert the same pressure on the actuator lever 148 to pull the plunger 62 towards the drum, but it may feel sturdier, as the hand lever 147 is no longer moving. As the hand lever 147 is fully depressed, a bail spring 152 urges a bail 150 to engage it, a cam action provided by cam 151 on the bail 150 determining whether it is locked in place or released. When locked in, pressing energy is then stored until the workpiece is carved away, or the bail 150 is unhooked. That is, in the sixth illustrative embodiment, the lever 72 (e.g., the third lever) is divided into two levers pivoting on the same or similar axes and sprung such that, after clamping the plunger 62 against the drum 10, the hand lever 147 can be fully depressed and immobile while the spring 149 continues to urge the actuator lever 148 forward as the workpiece is grated away and reduced in size.

In the sixth illustrative embodiment, referring again to FIGS. 29-37, the hand lever 147 is rotatably pinned by the second pivot pin 74, and the actuator lever 148 is also rotatably pinned by the second pivot pin 74. The actuator spring 149 circling the second pivot pin 74 engages both the hand lever 147 and the actuator lever 148. The bail 150 may hold the hand lever 147 in the depressed position. The bail 150 is held in a locked or unlocked position by the cam 151 engaging with the bail spring 152.

The sixth illustrative embodiment provides the stability of a static handle and eliminates ongoing hand strain.

In the sixth illustrative embodiment, a rotating hook, a sliding pin or bolt can be substituted for the bail 150 (i.e., other types of locking members may be used).

It is to be understood that the features of the illustrative embodiments set forth above can be intermingled to create additional embodiments. In addition, various features of the illustrative embodiments can be modified, for example, to fit the particular needs of a user.

As one example of a possible modification, the grater 100 of the first illustrative embodiment can have molded-in pins. The grater 200 of the second illustrative embodiment can have metal or other pins inserted.

As another example of a possible modification, the grater 100 of the first illustrative embodiment can have the metal drum molded into the support structure. The drum of the second illustrative embodiment can have a separate support structure including cross ribs.

As yet another example of a possible modification, instead of being formed from plastic, various components of the graters 100, 200, 300, 300', 400, 500, 600 described above can be stamped out of stainless-steel sheet and/or wire.

In one or more alternative embodiments of the grater, friction caused by plastic against plastic, or worse, stainless steel against stainless steel, can be reduced where the end of the lever 72, 72' pulls up on the barrel wall in any one or more of several ways: (i) a roller can be pinned to the end of the lever 72, 72', or the end of the lever 72, 72' can be provided with a slicker bearing surface. In the case of a plastic grater body, the bearing material can be stainless steel. In a stainless-steel grater, the bearing can be acetal or other plastic. The bearing material can be located on the wall instead of the lever 72, 72'.

In one or more alternative embodiments of the grater, to reduce the width of the device and to reduce complexity, the lock ring can be eliminated and one end of the drum can be flared to be constrained by the body of the grater. In that case, the crank on the opposite end can extend into the barrel of the body to provide the bearing surface on that end. To maintain left-handed capability, the cutting edges of the grating drum can be arranged so as to cut in either direction.

In one or more embodiments of the grater, the curved face of the plunger head 70 can be arrayed with grooves, pyramids, or curves to capture longer workpieces, preventing them from slipping out.

In one or more alternative embodiments of the grater, a disk could be substituted for the drum as an alternative type of rotatable cutting device.

Most of the features in the various embodiments can be mixed with features in the other embodiments. For instance, the integrated pivot pins, the clamshell design, the bidirectional blades, the bayonet mount or wishbone-type crank could be used on any combination with other features. The clamshell design of the third illustrative embodiment can be assembled in different ways by replacing the hinge with a snap or snaps, interlocking fingers or other means.

It is readily apparent that the aforedescribed hand-held rotary grater 100, 200, 300, 3000', 400, 500, 600 offers numerous advantages and benefits. For example, the hand-held rotary grater 100, 200, 300, 300', 400, 500, 600 provides one or more of the following benefits: (1) an additional lever to compound force applied by the palm (instead of the thumb) to the plunger acting on the workpiece, (2) a plunger that is restrained from torsional flexure that would enable it to interfere with the grater, (3) a crank that can be reinstalled in reverse, and (4) a drum that can be molded with minimal tooling.

Advantageously, the hand-held rotary grater 100, 200, 300, 300', 400, 500, 600 described herein provides one or more of the following additional benefits: (1) the ability to engage the workpiece with the rotating grate using minimal hand strength; (2) a means of avoiding damage to the grater and contamination of food; (3) a means of reducing the width of the device when stored while keeping components together; and (4) a means of switching the crank from the left side to the right side of the grater even with the use of mono-directional blades on the drum. The hand-held rotary grater 100, 200, 300, 300', 400, 500, 600 described herein includes one or more of the following advantageous features: (1) an additional lever pinned (or otherwise rotatably affixed) to a plunger lever; (2) a wall affixed to the barrel by which the barrel and hopper can be pried towards the plunger by means of the third lever; (3) a crank having four internal tabs to be affixed to; (4) a drum encircled at one or both ends by four channels or grooves (by inserting said tabs into said grooves, the crank can be affixed to the drum so that the crank handle can face outwards to be cranked, or inwards to be stored); (5) a lock-ring that can be installed on either end of the drum; and (6) bumps on the drum that engage with an arrangement of dimples, ridges, digits and/or depressions that restrain workpieces from being ejected from the chopper.

INDEX OF ILLUSTRATED ELEMENTS

100: First Embodiment of Rotary Grater
10: drum
12: barrel
14: complete grater body
16: unidirectional blade
18: drum frame
20: small diameter drum bearing
22: large diameter drum bearing
24: drum support rib
26: retainer
28: crank
30a, 30b: retainer thrust bearing
32a, 32b: crank thrust bearing
34a, 34b: barrel thrust bearing
36: large diameter barrel bearing
38: small diameter barrel bearing
40: grip nub
42: crank arm
44: knob
46a, 46b: locking tab
48: locking notch
50: locking rib arm
52: locking rib stem
54: locking nub
56: barrel arm
58: barrel plunger bore
60: hopper
62: plunger
64: first pivot pin
66: plunger barrel bore
68: plunger arm
70: plunger paddle
72: lever
74: second pivot pin
76: plunger lever bore
78: lever plunger bore
80: lever grip
82: lever bearing
84: barrel arm bearing wall
200: Second Embodiment of Rotary Grater
62': alternative version of plunger
86a, 86b: plunger arm pin
88: lever plunger pin
90a, 90b: plunger pin flats
92a, 92b: lever pin flats
94a, 94b: barrel arm channel
96: plunger arm channel
98: half drum frame
101: half drum frame with lip
102: bidirectional blade
300: Third Embodiment of Rotary Grater
104: half frame with crank
106: grater arm body
108: grater hopper body
110: hinge pin
112: grater arm bore
114: grater hopper bore
116: grater arm snap tab
118: grater arm snap cavity
120: snap bolt 300': Modified Version of Third Embodiment of Rotary Grater
122: interlock tab
124: interlock slot
126: interlock barb
400: Fourth Embodiment of Rotary Grater
128: half frame with ears
130a, 130b: ear
132a, 132b: ear bores
134: wishbone-shaped crank
136a, 136b: wishbone struts
138a, 138b: wishbone crank flanges
140a, 140b: crank pin
500: Fifth Embodiment of Rotary Grater
72': alternative version of lever
82': alternative version of lever bearing
144: barrel arm lever bore
146: plunger arm bearing wall
600: Sixth Embodiment of Rotary Grater
147: hand lever
148: actuator lever
149: actuator spring
150: bail
151: cam
152: bail spring Any of the features or attributes of the above described embodiments and variations can be used in combination with any of the other features and attributes of the above described embodiments and variations as desired.

Although the rotary grater has been shown and described with respect to a certain embodiments, it is apparent that the aforedescribed rotary grater can be embodied in many different forms and that many other modifications and variations are possible without departing from the spirit and scope of the claimed invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A rotary grater, comprising:
a grater body, the grater body including a cutter housing portion, a hopper portion connected to the cutter housing portion, and a body arm portion extending outwardly from the hopper portion, the hopper portion of the grater body being configured to hold a workpiece for grating;
a rotatable cutting device, the rotatable cutting device configured to be rotatably disposed inside the cutter housing portion of the grater body, the rotatable cutting device comprising a plurality of blade members for grating the workpiece;
a rotary input device coupled to the rotatable cutting device, the rotary input device configured to rotate the rotatable cutting device;
a grater plunger, the grater plunger including a plunger arm portion connected to a plunger head portion, the plunger arm portion having a first arm end and a second arm end, the second arm end of the plunger arm portion being oppositely disposed relative to the first arm end, the first arm end of the plunger arm portion being pivotably coupled to a distal end of the body arm portion, and the second arm end of the plunger arm portion being connected to the plunger head portion, the plunger head portion configured to compress the workpiece in the hopper portion during the grating of the workpiece; and
a lever member pivotably coupled to the plunger arm portion or the body arm portion, the lever member having a first lever end portion and a second lever end portion, the second lever end portion of the lever member being oppositely disposed relative to the first lever end portion, the first lever end portion of the lever member configured to receive an input force applied by a user, and the second lever end portion of the lever member configured to apply an output force against a bearing wall of the grater body or the grater plunger so as to facilitate a compressing of the workpiece between the plunger head portion and the rotatable cutting device during the grating of the workpiece;
wherein the lever member is pivotably coupled to a middle region of the body arm portion, and the bearing wall against which the output force of the second lever end portion of the lever member is applied comprises a part of the grater plunger.

2. The rotary grater according to claim 1, wherein the lever member is pivotably coupled to a middle region of the body arm portion by a first pin member, and the first arm end of the plunger arm portion is pivotably coupled to the distal end of the body arm portion by a second pin member.

3. The rotary grater according to claim 1, wherein the rotary input device comprises a crank coupled to the rotatable cutting device, the crank configured to rotate the rotatable cutting device when the crank is rotated by the user.

4. The rotary grater according to claim 3, wherein the crank comprises a crank arm and a handle portion coupled to the crank arm, the handle portion configured to be grasped by the user when the crank is being rotated by the user; and
wherein the crank is removably coupled to the rotatable cutting device such that the crank is reversible from a first configuration where the handle portion projects outwardly from the rotary grater to a second configuration where the handle portion projects inwardly towards a centerline of the rotary grater, the second configuration enabling the rotary grater to be more compact for storage.

5. The rotary grater according to claim 3, wherein the crank comprises a wishbone-shaped body portion coupled to a handle portion, the wishbone-shaped body portion including a first branch with a first attachment member and a second branch with a second attachment member;
wherein the rotatable cutting device comprises a first tab member and a second tab member, the second tab member being oppositely disposed relative to the first tab member; and
wherein, when the first and second branches of the wishbone-shaped body portion are displaced inwardly toward one another by the user, the first attachment member is configured to be removably engaged with the first tab member, and the second attachment member is configured to be removably engaged with the second tab member so as to removably attach the crank to the rotatable cutting device.

6. The rotary grater according to claim 1, wherein the cutter housing portion of the grater body comprises a first housing section hingedly connected to a second housing section for allowing the rotatable cutting device to be inserted into the cutter housing portion and removed from the cutter housing portion.

7. The rotary grater according to claim 6, wherein the cutter housing portion of the grater body further comprises a securement device for removably retaining the first housing section and the second housing section in a closed configuration.

8. The rotary grater according to claim 1, wherein the rotatable cutting device comprises a cylindrical cutting device and the rotary input device comprises a crank connected to a first circular frame member, the first circular frame member configured to be removably attached to one end of the cylindrical cutting device.

9. The rotary grater according to claim 8, wherein the rotatable cutting device further comprises a second circular frame member configured to be removably attached to the other end of the cylindrical cutting device that is opposite to the end on which the first circular frame member is attached.

10. A rotary grater, comprising:
a grater body, the grater body including a cutter housing portion, a hopper portion connected to the cutter housing portion, and a body arm portion extending outwardly from the hopper portion, the hopper portion of the grater body being configured to hold a workpiece for grating;
a rotatable cutting device, the rotatable cutting device configured to be rotatably disposed inside the cutter housing portion of the grater body, the rotatable cutting device comprising a plurality of blade members for grating the workpiece;
a rotary input device coupled to the rotatable cutting device, the rotary input device configured to rotate the rotatable cutting device, the rotary input device comprising a crank coupled to the rotatable cutting device, the crank configured to rotate the rotatable cutting device when the crank is rotated by a user, the crank comprising a crank arm and a handle portion coupled to the crank arm, the handle portion configured to be grasped by the user when the crank is being rotated by the user, and the crank being removably coupled to the rotatable cutting device such that the crank is reversible from a first configuration where the handle portion projects outwardly from the rotary grater to a second configuration where the handle portion projects inwardly towards a centerline of the rotary grater, the second configuration enabling the rotary grater to be more compact for storage;
a grater plunger, the grater plunger including a plunger arm portion connected to a plunger head portion, the plunger arm portion having a first arm end and a second arm end, the second arm end of the plunger arm portion being oppositely disposed relative to the first arm end, the first arm end of the plunger arm portion being pivotably coupled to a distal end of the body arm portion, and the second arm end of the plunger arm portion being connected to the plunger head portion, the plunger head portion configured to compress the workpiece in the hopper portion during the grating of the workpiece; and
a lever member pivotably coupled to the plunger arm portion or the body arm portion, the lever member having a first lever end portion and a second lever end portion, the second lever end portion of the lever member being oppositely disposed relative to the first lever end portion, the first lever end portion of the lever member configured to receive an input force applied by the user, and the second lever end portion of the lever member configured to apply an output force against a bearing wall of the grater body or the grater plunger so as to facilitate a compressing of the workpiece between the plunger head portion and the rotatable cutting device during the grating of the workpiece.

11. The rotary grater according to claim 10, wherein the lever member is pivotably coupled to a middle region of the plunger arm portion, and the bearing wall against which the output force of the second lever end portion of the lever member is applied comprises a part of the grater body.

12. The rotary grater according to claim 11, wherein the lever member is pivotably coupled to the middle region of the plunger arm portion by a first pin member, and the first arm end of the plunger arm portion is pivotably coupled to the distal end of the body arm portion by a second pin member.

13. The rotary grater according to claim 12, wherein the first pin member is integrally formed with the lever member, and the second pin member is integrally formed with the plunger arm portion of the grater plunger.

14. The rotary grater according to claim 10, wherein the lever member is pivotably coupled to a middle region of the body arm portion, and the bearing wall against which the output force of the second lever end portion of the lever member is applied comprises a part of the grater plunger.

15. The rotary grater according to claim 14, wherein the lever member is pivotably coupled to a middle region of the body arm portion by a first pin member, and the first arm end of the plunger arm portion is pivotably coupled to the distal end of the body arm portion by a second pin member.

16. The rotary grater according to claim 10, wherein the lever member is pivotably coupled to a middle region of the plunger arm portion, and the bearing wall against which the output force of the second lever end portion of the lever member is applied comprises a part of the grater body; and
wherein the lever member comprises a first lever section hingedly coupled to a second lever section, the first lever section including the first lever end portion of the lever member that is configured to receive the input force applied by the user, and the second lever section including the second lever end portion of the lever member that is configured to apply the output force against the bearing wall of the grater body.

17. The rotary grater according to claim 16, wherein the first and second lever sections of the lever member are pivotably coupled to one another and to a middle region of the plunger arm portion by a first pin member, and the first arm end of the plunger arm portion is pivotably coupled to the distal end of the body arm portion by a second pin member.

18. The rotary grater according to claim 17, wherein the lever member further comprises an actuator spring disposed around the first pin member, the actuator spring coupling the first lever section to the second lever section so that, when the input force is applied to the first lever section, a torque generated by the input force applied to the first lever section is substantially transferred to the second lever section so as to apply the output force against the bearing wall of the grater body.

19. The rotary grater according to claim 18, further comprising a locking member for maintaining the first lever section in a depressed position; and
wherein, while the first lever section is maintained in the depressed position, the actuator spring results in the plunger head portion maintaining a continuous compressive force on the workpiece in the hopper portion during the grating of the workpiece.

20. A rotary grater, comprising:

a grater body, the grater body including a cutter housing portion, a hopper portion connected to the cutter housing portion, and a body arm portion extending outwardly from the hopper portion, the hopper portion of the grater body being configured to hold a workpiece for grating;

a rotatable cutting device, the rotatable cutting device configured to be rotatably disposed inside the cutter housing portion of the grater body, the rotatable cutting device comprising a plurality of blade members for grating the workpiece;

a rotary input device coupled to the rotatable cutting device, the rotary input device configured to rotate the rotatable cutting device, the rotatable cutting device comprising a cylindrical cutting device and the rotary input device comprises a crank connected to a first circular frame member, the first circular frame member configured to be removably attached to one end of the cylindrical cutting device;

a grater plunger, the grater plunger including a plunger arm portion connected to a plunger head portion, the plunger arm portion having a first arm end and a second arm end, the second arm end of the plunger arm portion being oppositely disposed relative to the first arm end, the first arm end of the plunger arm portion being pivotably coupled to a distal end of the body arm portion, and the second arm end of the plunger arm portion being connected to the plunger head portion, the plunger head portion configured to compress the workpiece in the hopper portion during the grating of the workpiece; and a lever member pivotably coupled to the plunger arm portion or the body arm portion, the lever member having a first lever end portion and a second lever end portion, the second lever end portion of the lever member being oppositely disposed relative to the first lever end portion, the first lever end portion of the lever member configured to receive an input force applied by a user, and the second lever end portion of the lever member configured to apply an output force against a bearing wall of the grater body or the grater plunger so as to facilitate a compressing of the workpiece between the plunger head portion and the rotatable cutting device during the grating of the workpiece.

21. The rotary grater according to claim 20, wherein the rotatable cutting device further comprises a second circular frame member configured to be removably attached to the other end of the cylindrical cutting device that is opposite to the end on which the first circular frame member is attached.

* * * * *